United States Patent
Pratt

(10) Patent No.: US 10,224,970 B2
(45) Date of Patent: Mar. 5, 2019

(54) WIDEBAND DIGITAL PREDISTORTION

(71) Applicant: Analog Devices Global, Hamilton (BM)

(72) Inventor: Patrick Pratt, Mallow (IE)

(73) Assignee: Analog Devices Global, Hamilton (BM)

( * ) Notice: Subject to any disclaimer, the term of this patent is extended or adjusted under 35 U.S.C. 154(b) by 0 days.

(21) Appl. No.: 15/159,492

(22) Filed: May 19, 2016

(65) Prior Publication Data

US 2017/0338841 A1 Nov. 23, 2017

(51) Int. Cl.
*H04B 1/04* (2006.01)
*H04L 25/03* (2006.01)

(52) U.S. Cl.
CPC ..... *H04B 1/0475* (2013.01); *H04L 25/03159* (2013.01); *H04L 25/03343* (2013.01);
(Continued)

(58) Field of Classification Search
CPC .... H03F 1/3247; H03F 1/3258; H03F 1/3241; H03F 2201/3233; H03F 1/3282;
(Continued)

(56) References Cited

U.S. PATENT DOCUMENTS 4,470,020 A  9/1984 Mohr
4,970,470 A  11/1990 Gosser
(Continued)

FOREIGN PATENT DOCUMENTS

EP  1560329 A1  8/2005

OTHER PUBLICATIONS

Gilabert, Pere L., et al., "Chapter 8—Look-up table based digital predistortion schemes and implementation", *Digital Front-End in Wireless Communication—Circuits and Signal Processing*, Luo, Fa-Long, Editor, (2011), 214-243.
(Continued)

*Primary Examiner* — Vineeta S Panwalkar
(74) *Attorney, Agent, or Firm* — Schwegman Lundberg & Woessner, P.A.

(57) ABSTRACT

Various examples are directed to systems and methods for wideband digital predistortion. A digital pre-distortion circuit may be programmed to receive a complex baseband signal and generate a pre-distorted signal. Generating the pre-distorted signal may comprise applying to the complex baseband signal a first correction for an $N^{th}$ order distortion of a power amplifier at an $I^{th}$ harmonic frequency zone centered at about an $I^{th}$ harmonic of a carrier frequency and applying to the complex baseband signal a second correction for the $N^{th}$ order distortion at a $J^{th}$ harmonic frequency zone centered at about a $J^{th}$ harmonic of the carrier frequency different than the $I^{th}$ harmonic of a carrier frequency.

22 Claims, 11 Drawing Sheets

(52) U.S. Cl.
CPC ............... *H04B 2001/0425* (2013.01); *H04L 2025/03356* (2013.01)

(58) Field of Classification Search
CPC ......... H03F 2200/451; H03F 2200/336; H04B 1/0475; H04B 1/525; H04B 2001/0425; H04L 25/03159; H04L 25/03343; H04L 2025/03356
See application file for complete search history.

(56) References Cited

U.S. PATENT DOCUMENTS

| | | | |
|---|---|---|---|
| 5,049,832 | A | 9/1991 | Cavers |
| 5,123,732 | A | 6/1992 | Gross et al. |
| 6,081,158 | A | 6/2000 | Twitchell et al. |
| 6,314,142 | B1 | 11/2001 | Perthold et al. |
| 6,342,810 | B1 | 1/2002 | Wright et al. |
| 6,630,862 | B1 | 10/2003 | Perthold et al. |
| 6,798,282 | B1 | 9/2004 | Broekaert et al. |
| 6,798,843 | B1 | 9/2004 | Wright et al. |
| 7,418,056 | B2 | 8/2008 | Suzuki et al. |
| 7,460,613 | B2 | 12/2008 | Sahlman |
| 7,542,519 | B2 | 6/2009 | Mccallister |
| 7,796,960 | B1 | 9/2010 | Rashev et al. |
| 8,306,149 | B2 | 11/2012 | Mujica et al. |
| 8,351,876 | B2 | 1/2013 | Mccallister et al. |
| 8,433,263 | B2 | 4/2013 | Pratt et al. |
| 8,502,567 | B2 | 8/2013 | Lawas |
| 8,605,819 | B2 | 12/2013 | Lozhkin |
| 8,649,743 | B2 | 2/2014 | Mccallister et al. |
| 8,909,175 | B1* | 12/2014 | McCallister ......... H04B 1/0475 330/127 |
| 8,948,293 | B2 | 2/2015 | Onggosanusi et al. |
| 8,948,301 | B2 | 2/2015 | Rollins |
| 8,958,504 | B2 | 2/2015 | Warke et al. |
| 9,071,487 | B2 | 6/2015 | Pratt |
| 9,184,710 | B2 | 11/2015 | Braithwaite |
| 9,252,821 | B2 | 2/2016 | Shor et al. |
| 9,374,044 | B2 | 6/2016 | Jian et al. |
| 9,484,962 | B1 | 11/2016 | Magesacher et al. |
| 9,614,557 | B1 | 4/2017 | Mayer et al. |
| 9,628,119 | B2 | 4/2017 | Gal et al. |
| 9,628,120 | B2 | 4/2017 | Yu et al. |
| 9,641,206 | B2 | 5/2017 | Pratt et al. |
| 9,735,741 | B2 | 8/2017 | Pratt et al. |
| 9,813,223 | B2 | 11/2017 | Azadet |
| 9,893,748 | B2 | 2/2018 | Ye et al. |
| 10,033,413 | B2 | 7/2018 | Pratt |
| 2004/0116083 | A1* | 6/2004 | Suzuki ................. H03F 1/3258 455/126 |
| 2005/0231279 | A1 | 10/2005 | Moffatt et al. |
| 2006/0109930 | A1 | 5/2006 | O'Sullivan et al. |
| 2008/0144709 | A1 | 6/2008 | McCallister et al. |
| 2009/0124218 | A1 | 5/2009 | McCallister et al. |
| 2009/0227215 | A1 | 9/2009 | McCallister |
| 2009/0280758 | A1 | 11/2009 | Pratt et al. |
| 2010/0098191 | A1 | 4/2010 | Morris et al. |
| 2011/0135034 | A1 | 6/2011 | Mujica et al. |
| 2011/0270590 | A1 | 11/2011 | Aparin et al. |
| 2012/0007672 | A1 | 1/2012 | Peyresoubes et al. |
| 2012/0034886 | A1 | 2/2012 | Mccallister et al. |
| 2012/0034887 | A1 | 2/2012 | Mccallister et al. |
| 2013/0166259 | A1 | 6/2013 | Weber et al. |
| 2014/0362949 | A1 | 12/2014 | Pratt |
| 2015/0016567 | A1 | 1/2015 | Chen |
| 2015/0043678 | A1 | 2/2015 | Hammi |
| 2015/0162881 | A1 | 6/2015 | Hammi |
| 2015/0318880 | A1 | 11/2015 | Rexberg et al. |
| 2016/0087657 | A1 | 3/2016 | Yu et al. |
| 2016/0191020 | A1 | 6/2016 | Velazquez |
| 2016/0204809 | A1 | 7/2016 | Pratt et al. |
| 2016/0294601 | A1 | 10/2016 | Frederick |
| 2016/0308577 | A1 | 10/2016 | Molina et al. |
| 2016/0352290 | A1 | 12/2016 | Gavert et al. |
| 2017/0033809 | A1 | 2/2017 | Liu |
| 2017/0104503 | A1 | 4/2017 | Pratt et al. |
| 2017/0207802 | A1 | 7/2017 | Pratt et al. |
| 2017/0237455 | A1 | 8/2017 | Ye et al. |

OTHER PUBLICATIONS

"U.S. Appl. No. 15/159,532, Examiner Interview Summary dated Aug. 7, 2017", 3 pgs.
"U.S. Appl. No. 15/159,532, Non Final Office Action dated May 4, 2017", 10 pgs.
"U.S. Appl. No. 15/159,532, Response filed Aug. 4, 2017 to Non Final Office Action dated May 4, 2017", 13 pgs.
"European Application Serial No. 17168399.8, European Search Report dated Jul. 11, 2017", 9 pgs.
"U.S. Appl. No. 15/159,532, Final Office Action dated Nov. 16, 2017", 9 pgs.
"U.S. Appl. No. 15/159,532, Notice of Allowance dated Mar. 26, 2018", 14 pgs.
"U.S. Appl. No. 15/159,532, Response filed Feb. 16, 2018 to Final Office Action dated Nov. 16, 2017", 11 pgs.
"U.S. Appl. No. 16/024,303, Non Final Office Action dated Sep. 19, 2018", 8 pgs.

* cited by examiner

WIDEBAND DIGITAL PREDISTORTION

TECHNICAL FIELD

This document pertains generally, but not by way of limitation, to integrated circuits and communication systems, and particularly, but not by way of limitation to digital predistortion for wideband input signals.

BACKGROUND

Radiofrequency (RF) communications, such as for mobile telephony, may use an RF power amplifier (PA) circuit in an RF transmitter to produce the RF signal for transmission over the air to an RF receiver. The PA circuit may have a nonlinear gain characteristic, such as gain compression occurring at higher power output levels, which can lead to signal distortion at such higher power levels.

U.S. Pat. No. 6,342,810, for example, mentions a method of compensating for amplifier nonlinearities by using predistortion to apply an inverse model of the amplifier's transfer characteristic to an input signal of the amplifier. A goal of such predistortion is to reduce distortion due to the PA circuit gain nonlinearity.

SUMMARY

The present inventors have recognized, among other things, that allowing a power amplifier (PA) circuit to operate including in its nonlinear (e.g., gain compression) region, such as by using predistortion compensation, can provide one or more benefits, such as to improve amplifier efficiency and performance, reduce power consumption, reduce waste heat generation, and reduce or avoid the need for active or passive cooling of the PA circuit, but that using the PA circuit with wideband input signals may present additional challenges that can increase distortion and noise in a PA circuit.

A PA circuit operated at least in part in its nonlinear region produces distortions across a wide frequency band. For example, when a PA circuit is used to amplify a carrier-modulated input signal, the PA circuit generates distortion terms centered at the carrier frequency and at harmonics of the carrier frequency. When the input signal has a bandwidth that is less than the carrier frequency, predistortion compensation may be used to correct for distortion terms centered at the carrier frequency, while distortion terms at the carrier frequency harmonics are removed by low-pass filtering. When the input signal is a wideband or ultra wide band signal with a bandwidth similar to or larger than the carrier frequency, however, the input signal frequency band may overlap with distortion terms at one or more of the carrier frequency harmonics. This may make it may difficult to use low-pass filtering to remove harmonic distortion terms without also degrading the input signal.

Among other things, this document explains how predistortion compensation can be used to correct distortion terms at the carrier frequency and to correct distortion terms at one or more carrier frequency harmonics. For example, the input signal may be and/or be converted to a complex signal (e.g., a complex baseband signal) and predistortion compensation may operate completely or partially in complex terms. Complex operation may provide certain advantages including, for example, lower clock rates, and simpler compatibility with existing communications links. Various other advantages will be apparent to those skilled in the art.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

U.S. patent application Ser. No. 15/159532, entitled "MIXED-MODE DIGITAL PREDISTORTION," and filed concurrently herewith is incorporated herein by reference in its entirety.

Figure 1:
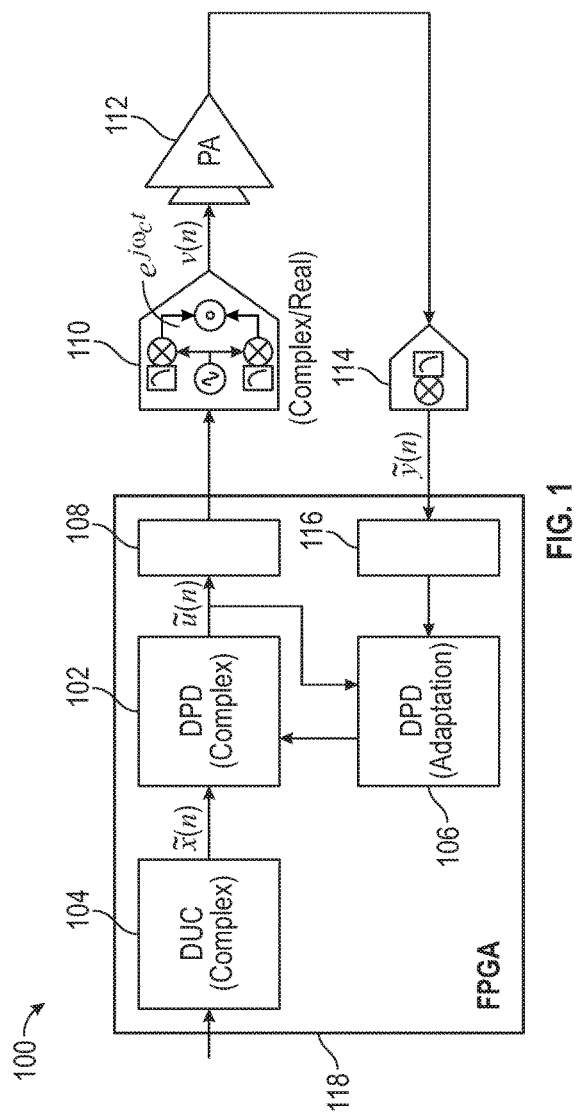
FIG. 1 shows an example of a power amplifier (PA) system with wideband digital predistortion.

FIG. 1 shows an example of a power amplifier (PA) system 100 with wideband digital predistortion. The PA circuit 100 may be utilized in various different settings including, for example, for RF transmission, such as cellular network transmissions, and/or for transmissions through a cable of a cable television network or similar network. A complex digital predistortion (DPD) circuit 102 may receive as an input signal a complex baseband signal $\tilde{x}(n)$. (Digital Upconverter (DUC) 104 will be described in more detail below.) The complex baseband signal $\tilde{x}(n)$ may have a real component and a quadrature component. The DPD circuit 102 may generate a pre-distorted complex baseband signal $\tilde{v}(n)$. The pre-distorted complex baseband signal $\tilde{v}(n)$ may be provided to a digital-to-analog converter (DAC) 110 (e.g., via a communications link 108). In some examples, the DAC 110 may also up-convert the pre-distorted complex baseband signal $\tilde{v}(n)$ to the carrier frequency to generate a transmission signal v(t), although in other examples a separate up-converter component may be used. The transmission signal v(t) may be provided to a power amplifier 112, such as for wireless or wired transmission.

A DPD adaptation or training circuit 106 may train the DPD circuit 102, for example, as described herein. An output of the PA 112 may be sampled by an analog-to-digital converter (ADC) 114 to generate a complex baseband feedback signal $\tilde{y}(n)$. In the example shown in FIG. 2, the ADC 114 also down-converts the sampled output of the PA 112 to baseband, although in other examples a separate downconverter component may be used. The ADC 114 may provide the complex baseband feedback signal $\tilde{y}(n)$ to the DPD training circuit 106, (e.g., via the communications link 116). The DPD training circuit 106 may also receive the pre-distorted complex baseband signal $\tilde{v}(n)$ generated by the DPD circuit 102. Based on the pre-distorted complex baseband signal $\tilde{v}(n)$ and the complex baseband feedback signal $\tilde{y}(n)$, the DPD adaptation circuit 106 may program and/or update the DPD circuit 102. Additional examples for training the DPD circuit 102 are described herein, for example, with respect to FIG. 7.

In the example of FIG. 1, the complex baseband signal $\tilde{x}(n)$ is received by the DPD circuit 102 from a digital up-converter (DUC) 104. The DUC 104 may be used in various applications, such as cable applications. For example, the DUC 104 may receive a set of channel signals. Each channel signal may be a complex signal centered at baseband. In some cable television applications, each channel signal represents one television channel. The DUC 104 may stack the channel signals to generate the complex baseband signal.

In a simple example, the DUC 104 receives four channel signals, each having a bandwidth B, and each centered at a frequency B/2. The first channel signal may remain centered at B/2. The DUC 104 may translate the second channel signal to generate a translated second channel signal centered at 3B/2. The DUC 104 may translate the third channel signal to generate a translated third channel signal centered at 5B/2 and may translate the fourth channel signal to generate a translated fourth channel signal centered at 7B/2.

The DUC 104 may combine the first channel signal, the translated second channel signal, the translated third channel signal, and the translated third channel signal to generate the complex baseband signal. The resulting complex baseband signal may have a bandwidth of 4B. Although this example includes four channel signals, more or fewer channel signals may be acted on by the DUC 104. Also, in some examples, the channels may be stacked in any suitable order. Further, although the channel input signals received by the DUC 104 are described as being received at the DUC 104 in complex baseband, in some examples, the DUC 104 may receive real channel signals and convert the real channel signals to the complex baseband signal output. Also, in some examples, the output of the DUC 104 may be expressed as a real signal and may be converted to complex form by a subsequent circuit component.

The example of FIG. 1 shows a configuration of the PA circuit 100 implemented utilizing a Field Programmable Gate Array (FPGA) 118. For example, the DUC 104, DPD circuit 102, and DPD adaptation circuit 106 are shown implemented by the FPGA 118. Components or modules not implemented by the FPGA 118 in FIG. 1 may be implemented using any other suitable hardware. The communications links 108, 116 shown in FIG. 1 may be used to facilitate communications between the FPGA 118 and the various other components of the PA circuit 100. The communications links 108, 116 may be configured according to any suitable protocol, such as the JESD204 serial protocol. Although the communications links 108, 116 are shown on the FPGA 118, in some examples, communications protocols 108, 116 may be implemented with different hardware components. Also, in some examples, the DPD adaptation circuit 106 may be implemented off of the FPGA 118, such as at a separate digital signal processor (DSP) (not shown). For example, the DPD adaptation circuit 106 may train the DPD circuit 102 at a clock rate slower than the operation of the DPD circuit 102 allowing the DPD adaptation circuit 106 to be implemented on a slower DSP rather than the FPGA 118.

Figure 2:
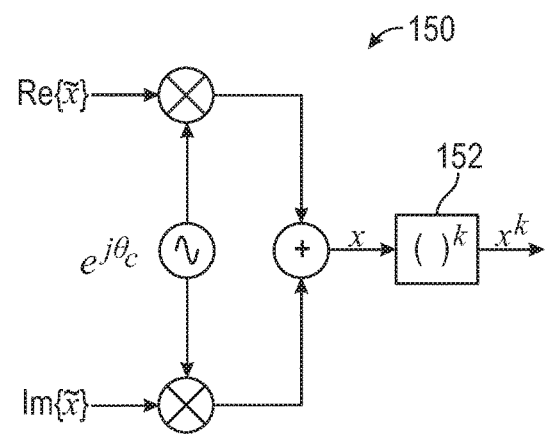
FIGS. 2-3 show examples illustrating signal and distortion terms generated by a power amplifier.
Figure 3:
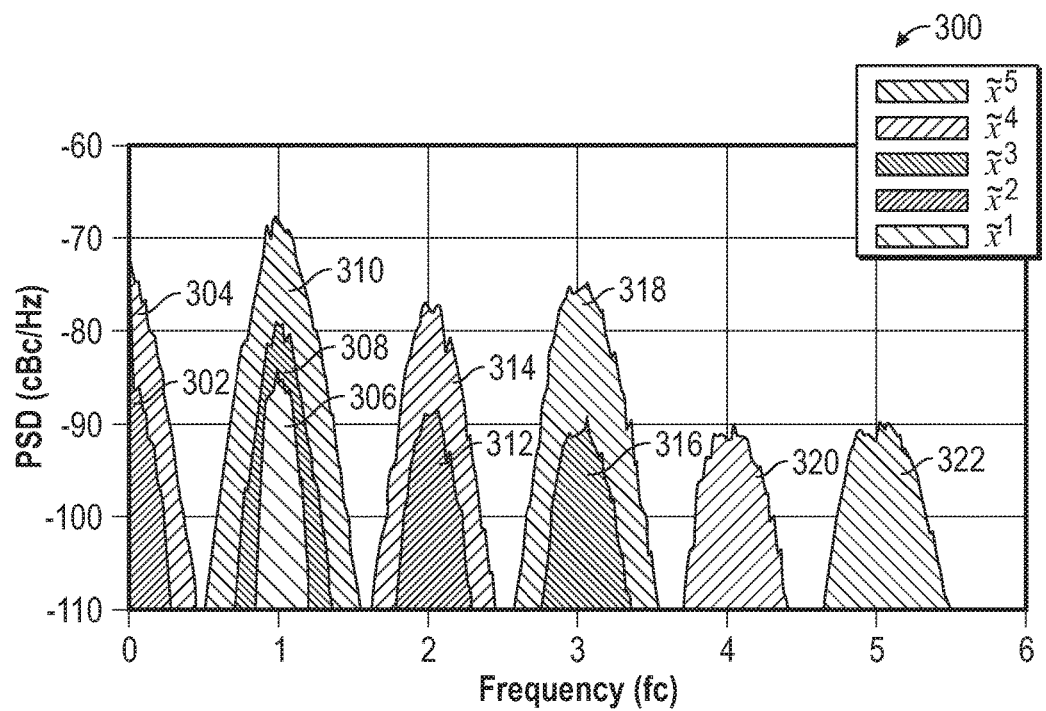

FIGS. 2-3 show examples illustrating signal and distortion terms generated by a PA, such as the PA 112. FIG. 2 is a model 150 of a power amplifier showing a term introduced to a complex baseband signal by the power amplifier. In FIG. 2, the complex baseband signal is represented by a real component $Re\{\tilde{x}\}$ and an imaginary or quadrature component $Im\{\tilde{x}\}$. The real and quadrature components are up-converted by a carrier signal, represented by $e^{j\theta_c}$, to generate a modulated signal x. When the modulated signal x is acted upon by a power amplifier, it may result in a term 152, as indicated by distorted signal $x^k$. A $1^{st}$ order term (k=1) may be an amplified representation of the modulated signal x itself. Higher order terms (k>1) may be distortion terms.

FIG. 3 is a plot 300 showing an example of power amplifier signal and distortion terms by frequency and power spectral density. In other examples, power amplifier and complex baseband signal combinations may create more or fewer terms than are shown in FIG. 3. In FIG. 3, the vertical axis denotes power spectral density of the terms in decibels relative to the carrier per cycle per second (dBc/Hz). The horizontal axis denotes frequency in terms of the carrier frequency fc, which may be equal to $\theta_c/2\pi$. FIG. 3 shows signal and distortion terms of various orders. Terms of $1^{st}$, $2^{nd}$, $3^{rd}$, $4^{th}$ and $5^{th}$ order are shown. Not all PA circuits will exhibit terms of each order 1, 2, 3, 4 and 5 shown in FIG. 3. Also, some PA circuits will exhibit additional distortion terms not shown in FIG. 3.

The signal and distortion terms show in FIG. 3 are distributed on the horizontal axis across several harmonic frequency zones. The harmonic frequency zones are centered at integer multiples of the carrier frequency. Integer multiples of the carrier frequency are also referred to as harmonics of the carrier frequency. The $0^{th}$ harmonic frequency zone is centered on zero or direct current (DC). Two distortion terms are shown at the $0^{th}$ harmonic zone including, a $2^{nd}$ order distortion term 302 (k=2) and a $4^{th}$ order distortion term 304 (k=4). The $1^{st}$ harmonic frequency zone is centered at the carrier frequency and includes three terms: a $1^{st}$ order signal term 306 (k=1), a $3^{rd}$ order distortion term 308 (k=3), and a $5^{th}$ order distortion term 310 (k=5). The $2^{nd}$ harmonic frequency zone is centered at twice the carrier frequency and includes two terms: a $2^{nd}$ order distortion term 312 (k=2), and a $4^{th}$ order distortion term 314 (k=4). The $3^{rd}$ harmonic frequency zone is centered at three times the carrier frequency and includes two terms: a $3^{rd}$ order distortion term 316 (k=3), and a $5^{th}$ order distortion term 318 (k=5). The $4^{th}$ harmonic frequency zone is centered at four times the carrier frequency and includes one term, a $4^{th}$ order distortion term 320 (k=4). The $5^{th}$ harmonic frequency zone is centered at five times the carrier frequency and includes one term, a $5^{th}$ order distortion term 322 (k=5).

As shown in FIG. 3, generally, even numbered harmonic frequency zones include even-order distortion terms while odd numbered harmonic frequency zones include the signal term and odd-order distortion terms. Also, distortion terms of the same order may tend to drop off in intensity as the harmonic frequency zone increases. TABLE 1 below shows mathematical expressions for the signal and distortion terms described above:

TABLE 1

| Order | Zone 0 | Zone 1 | Zone 2 | Zone 3 | Zone 4 | Zone 5 |
|---|---|---|---|---|---|---|
| $1^{st}$ | $\|\tilde{x}\|^0$ | $\|\tilde{x}\|^0(\tilde{x}e^{j\theta_c})^1$ | | | | |
| $2^{nd}$ | $\|\tilde{x}\|^2$ | | $\|\tilde{x}\|^0(\tilde{x}e^{j\theta_c})^2$ | | | |
| $3^{rd}$ | | $\|\tilde{x}\|^2(\tilde{x}e^{j\theta_c})^1$ | | $\|\tilde{x}\|^0(\tilde{x}e^{j\theta_c})^3$ | | |
| $4^{th}$ | $\|\tilde{x}\|^4$ | | $\|\tilde{x}\|^2(\tilde{x}e^{j\theta_c})^2$ | | $\|\tilde{x}\|^0(\tilde{x}e^{j\theta_c})^4$ | |
| $5^{th}$ | | $\|\tilde{x}\|^4(\tilde{x}e^{j\theta_c})^1$ | | $\|\tilde{x}\|^2(\tilde{x}e^{j\theta_c})^3$ | | $\|\tilde{x}\|^0(\tilde{x}e^{j\theta_c})^5$ |

Higher order distortion, when present, may behave in a similar manner. For example, $6^{th}$ order distortion may manifest as $6^{th}$ order distortion terms in harmonic frequency zones 0, 2, 4, and 6, with the $0^{th}$ harmonic frequency zone term having the highest intensity and higher harmonic frequency zone terms having lower intensities. Also, $7^{th}$ order distortion may manifest as $7^{th}$ order distortion terms in harmonic frequency zones 1, 3, 5, and 7, with the $1^{st}$ harmonic frequency zone term having the highest intensity and higher harmonic frequency zone terms having lower intensities.

Different PA and complex baseband signal combinations may generate distortion terms at different orders. The DPD circuit 102 may be configured to correct for some or all of the distortion terms generated by the PA 112. In some examples, the complex baseband signal $\tilde{x}(n)$ may be a wideband signal having a bandwidth that is larger than the carrier frequency, for example, ten times larger than the frequency of the carrier. In some examples, the DPD circuit 102 may not consider distortion terms at harmonic frequency bands that fall outside of the bandwidth of the complex baseband signal $\tilde{x}(n)$. Also, in some examples, the DPD circuit 102 may not consider distortion terms with magnitudes low enough to be ignored (e.g. below the noise floor of the output signal).

The DPD circuit 102 may be configured to generate the pre-distorted complex baseband signal $\tilde{v}(n)$ considering a model of the terms generated by the PA 112. The DPD circuit 102 may utilize any model suitable for nonlinear systems. In some examples, the DPD circuit 102 may be generated based on a Volterra series model. A Volterra series model may model distortion terms generated by the PA 112 considering the complex baseband signal and memory effects. For example, a representation of the Volterra series for a band limited nonlinear system (e.g., only terms around the $1^{st}$ harmonic frequency zone is given by Equation [1] below:

$$y(n) = \sum_{k=0}^{K} \tilde{y}_k(n) \quad [1]$$

$$\tilde{y}_k = \sum_{m_1=0}^{M} \sum_{m_3=0}^{M} \cdots \sum_{m_k}^{M} h_k(m_1, m_2, \ldots m_k) \prod_{j=1}^{\lfloor k/2 \rfloor} \tilde{x}(n-m_j) \prod_{j=\lfloor k/2 \rfloor+1}^{k} \tilde{x}^*(n-m_j)$$

In Equation [1], $\tilde{x}$ is the complex baseband signal and $\tilde{y}$ the complex baseband output. The value $\tilde{x}^*$ is the complex conjugate of the complex baseband signal. In some examples, the Volterra series may be reduced to a memory polynomial, for example, as shown by Equation [2] below:

$$y(n) = \sum_{k=0}^{K} \sum_{m=0}^{M} h_k(m) \prod_{j=1}^{\lfloor k/2 \rfloor} \tilde{x}(n-m) \prod_{j=\lfloor k/2 \rfloor+1}^{k} \tilde{x}^*(n-m) \quad [2]$$

In some examples including only odd distortion terms, Equation [2] may be further reduced as indicated by Equation [3] below:

$$y(n) = \sum_{k=0}^{K} \sum_{m=0}^{M} h_k(m) |\tilde{x}(n-m)|^{2k} \tilde{x}(n-m) \quad [3]$$

A memory effect occurs when the PA output depends at least in part on an input value (e.g., complex baseband signal value) at a previous time. In a PA circuit, memory effects can be caused by various physical phenomena such as heating at the power amplifier. For example, thermal behavior of the power amplifier 112, among other effects, may depend on the amplitude of the input $|\tilde{x}|$. Heat generated at the power amplifier may dissipate over time. Accordingly, distortion due to the temperature of the power amplifier may depend, at least in part on past values of the complex baseband signal $\tilde{x}(n)$.

Figure 4:
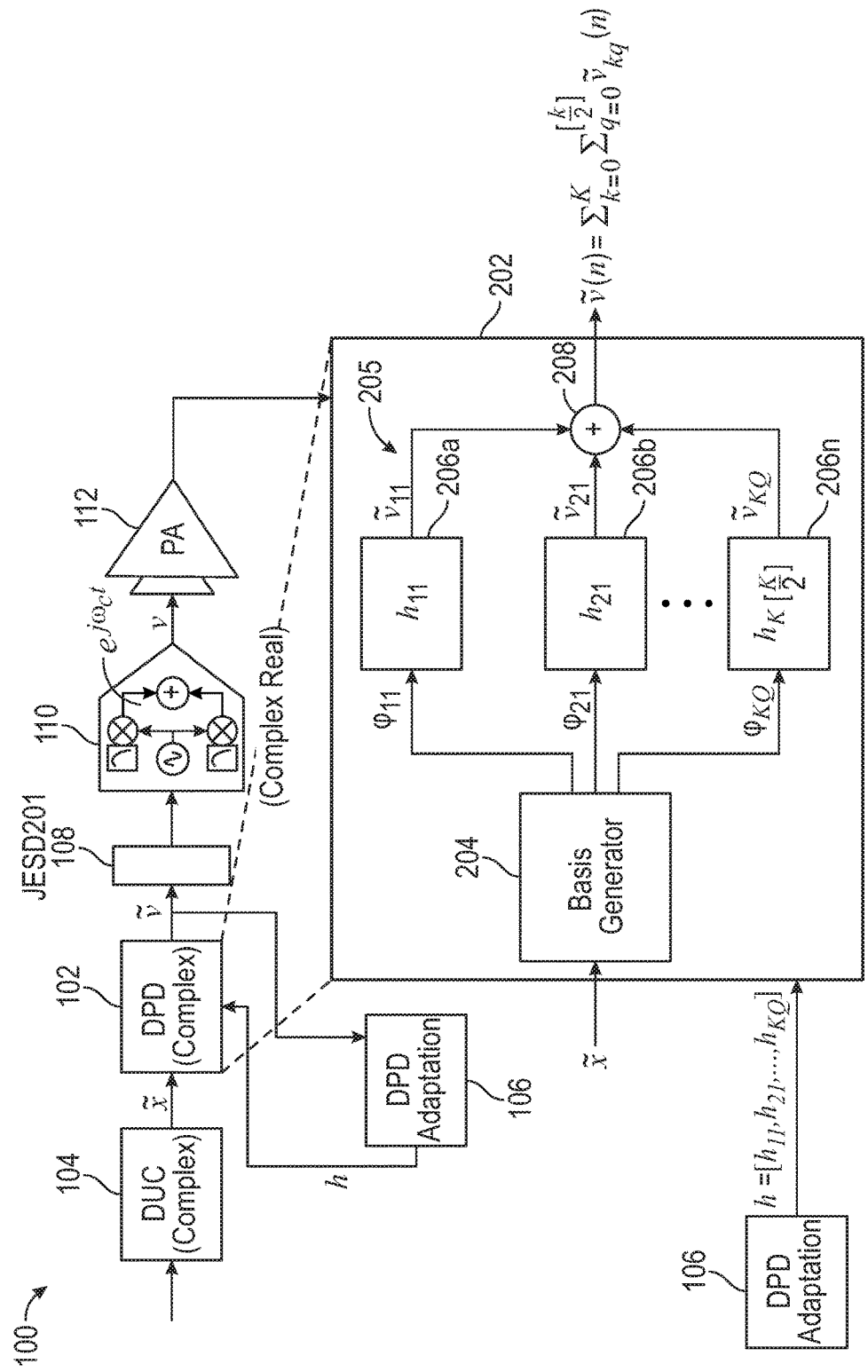
FIG. 4 is a diagram showing an example of the PA circuit of FIG. 1 including a digital predistortion (DPD) circuit with a polynomial approximation module that determines the pre-distorted complex baseband signal based at least in part on a polynomial approximation.

FIG. 4 is a diagram showing an example of the PA circuit 100 including DPD circuit 102 with a polynomial approximation module 202 that determines the pre-distorted complex baseband signal $\tilde{v}(n)$ based at least in part on a polynomial approximation. For example, the polynomial approximation module 202 may be configured to model distortion terms of the PA 112 using a polynomial approximation of the Volterra series. The polynomial approximation may include a number of basis functions. A basis function may correspond to a term to be corrected by the DPD circuit 102. An example form for a basis functions is given by Equation [4] below:

$$\phi_{k,k-2q} = |\tilde{x}|^{2q}(\tilde{x}e^{j\theta_c})^{k-2q} \quad [4]$$

In Equation 1, $\Phi_{k,k-2q}$ is the basis function. Also, k is the order of the term modeled by the basis function and q is a variable indicating the harmonic frequency zone in which the modeled term occurs. For example, distortion of a given order k may comprise terms in harmonic frequency zones given by k–2q for values of q from zero through the floor function of k/2. The floor function, indicated by ⌊argument⌋, may return the largest integer less than or equal to its argument. TABLE 2 below illustrates basis functions for terms of order k=1, 2, 3, 4 and 5 at zones (k–2q)=0, 1, 2, 3, 4 and 5.

TABLE 2

| Order | Zone 0 | Zone 1 | Zone 2 | Zone 3 | Zone 4 | Zone 5 |
|---|---|---|---|---|---|---|
| $1^{st}$ | | $\phi_{1,1} = (\tilde{x}e^{j\theta_c})^1$ | | | | |
| $2^{nd}$ | $\phi_{2,0}=|\tilde{x}|^2$ | | $\phi_{2,2} = (\tilde{x}e^{j\theta_c})^2$ | | | |
| $3^{rd}$ | | $\phi_{3,1} = |\tilde{x}|^2(\tilde{x}e^{j\theta_c})^1$ | | $\phi_{3,3} = (\tilde{x}e^{j\theta_c})^3$ | | |
| $4^{th}$ | $\phi_{4,0}=|\tilde{x}|^4$ | | $\phi_{4,2} = |\tilde{x}|^2(\tilde{x}e^{j\theta_c})^2$ | | $\phi_{4,4} = (\tilde{x}e^{j\theta_c})^4$ | |
| $5^{th}$ | | $\phi_{5,1} = |\tilde{x}|^4(\tilde{x}e^{j\theta_c})^1$ | | $\phi_{5,3} = |\tilde{x}|^2(\tilde{x}e^{j\theta_c})^3$ | | $\phi_{5,5} = (\tilde{x}e^{j\theta_c})^5$ |

The polynomial approximation module 202 may comprise a basis generator circuit 204 configured to receive the complex baseband signal, indicated in FIG. 4 by $\tilde{x}$, and generate a frequency-translated basis function value for each basis function. A frequency-translated basis function value may be a value for a basis function, translated by the carrier frequency. Equation [5] below gives an example form for the frequency-translated basis function:

$$\varphi_{kq} = \phi_{k,k-2q} e^{-j\theta_c} \quad [5]$$

In Equation [5], $\varphi_{kq}$ is the frequency-translated basis function and $e^{j\theta_c}$ is a carrier signal at the carrier frequency.

The polynomial approximation module 202 may also comprise a Finite Impulse Response (FIR) filter 205 having a number of taps 206a, 206b, 206n. Each tap 206a, 206b, 206n may correspond to a basis function. For example, each tap 206a, 206b, 206n may receive a value for a corresponding frequency-translated basis function and generate a complex baseband FIR response. The complex baseband FIR response for an example tap 206a 206b, 206n is given by Equation [6] below:

$$\tilde{v}_{kq} = \Sigma_{m=0}^{M} h_{kq}(m) \varphi_{kq}(n-m) \quad [6]$$

In Equation [6], $\tilde{v}_{kq}(n)$ is the complex baseband FIR response for a tap at a given sample n of the complex baseband signal. Also, $h_{kq}(m)$ may be a tap coefficient, which may be determined by the DPD adaption circuit 106, as described herein. In the example shown by Equation [6], the FIR filter 205 compensates for memory effect to a memory depth of M. For example, the tap coefficients are a function of m, where m is the number of samples prior to a given sample n. The memory depth M of the tap 206a, 206b, 206n may indicate the memory depth, or number of samples prior to the given sample n, that are considered to find the complex baseband FIR response for the given tap 206a, 206b, 206n at a given sample. Accordingly, a given tap 206a, 206b, 206n may comprise M tap coefficients $h_{kq}$(m).

The complex baseband FIR response $\tilde{v}_{kq}(n)$ for each tap 206a, 206b, 206n may be summed at summer 208 to generate the pre-distorted complex baseband signal, $\tilde{v}(n)$. In the example of FIG. 4, the pre-distorted complex baseband signal $\tilde{v}(n)$ may be given by Equation [7] below:

$$\tilde{v}(n) = \sum_{k=0}^{K} \sum_{q=0}^{\lfloor \frac{k}{2} \rfloor} \tilde{v}_{kq}(n) \quad [7]$$

Figure 5:
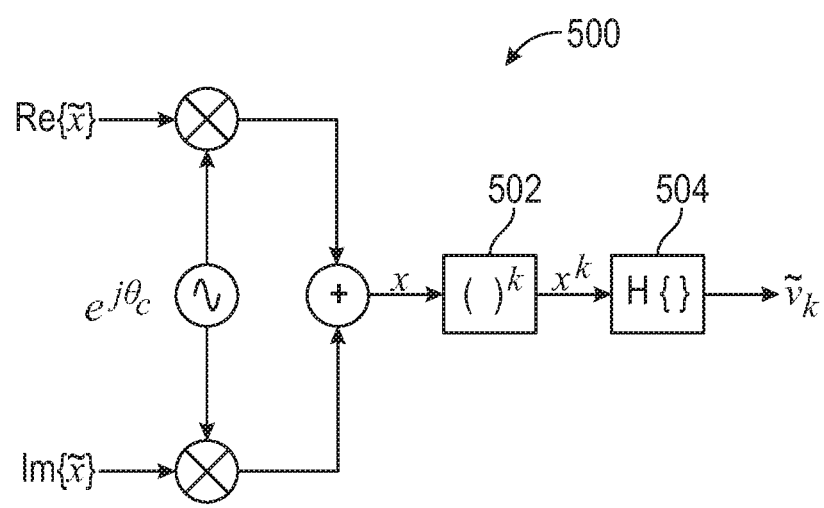
FIG. 5 is a diagram showing an example of a model of a pre-distorted term signal for a term of an order, given by k.

FIG. 5 is a diagram showing an example of a model 500 of a pre-distorted term signal $\tilde{v}_k$ for a term of an order, given by k. Similar to FIG. 2, in FIG. 5, the complex baseband signal $\tilde{x}(n)$ is represented by a real component Re{$\tilde{x}$} and a quadrature component Im{$\tilde{x}$}. The real and quadrature components are up-converted by a carrier signal represented by $e^{j\theta_c}$ to generate a modulated signal x. When the modulated signal x is acted upon by a power amplifier, it may result in a term 502, as indicated by distorted signal $x^k$. The distorted signal $x^k$ may be given by Equation [8] below:

$$x^k = \left(\frac{1}{2}\right)^k \sum_{q=0}^{\lfloor \frac{k}{2} \rfloor} \frac{2}{\lfloor \frac{2q}{k} \rfloor + 1} \binom{k}{q} |\tilde{x}|^{2q} \text{Re}\{(\tilde{x}e^{j\theta_c})^{k-2q}\} \quad [8]$$

The pre-distorted term signal $\tilde{v}_k$ may be found by taking a Hilbert transform of the distorted signal $x^k$ at box 504. The Hilbert transform may be expressed as a linear sum of basis functions, as given by Equation [9] below:

$$\tilde{v}_k = H\{x^k\} = \sum_{q=0}^{\lfloor \frac{k}{2} \rfloor} a_{k,k-2q} \phi_{k,k-2q}, \quad [9]$$

where: $a_{k,k-2q} = \frac{2^{k-1}}{\lfloor \frac{2q}{k} \rfloor + 1} \binom{k}{q},$ and $\phi_{k,k-2q} = |\tilde{x}|^{2q}(\tilde{x}e^{j\theta_c})^{k-2q}$ Using a memory polynomial structure for predistortion, as given in general form by Equations [2] and [3], the real mode pre-distorted signal v(n) may be given by Equation [10] below:

$$v(n) = \Sigma_{k=0}^{K} \Sigma_{m=0}^{M} h_k(m) Re\{\tilde{x}(n-m)\}^k \quad [10]$$

In some examples, Equation [10] may be generalized to the general memory polynomial or Volterra series form. For example, the generalized version of Equation [10] may be given by Equation [11] below:

$$\tilde{v}(n) = \sum_{k=0}^{K} \sum_{m_1=0}^{M_1} \sum_{m_2}^{M_2} h_k(m_1, m_2) \text{Re}\{\tilde{x}(n-m_1)\}^{k-1} \text{Re}\{\tilde{x}(n-m_2)\} \quad [11]$$

The complex-mode equivalent of Equation [11] may be given by Equation [12] below:

$$\tilde{v}(n) = \Sigma_{k=0}^{K} \Sigma_{m=0}^{M} h_k(m) H\{Re\{\tilde{x}(n-m)^k\}\} = \Sigma_{k=0}^{K} \Sigma_{m=0}^{M} h_k(m) \tilde{v}_k \quad [12]$$

In view of Equation [9], the pre-distorted complex baseband signal $\tilde{v}(n)$ over distortion of all orders k (e.g., all of the orders to be compensated by the DPD circuit 102) may be given by Equation [13] below:

$$\tilde{v}(n) = \sum_{k=0}^{K} \sum_{m=0}^{M} h_k(m) \sum_{q=0}^{\lfloor k/2 \rfloor} a_{k,k-2q}\, \phi_{k,k-2q}(n-m) \quad [13]$$

The term $h_k(m)\alpha_{k,k-2q}$ may be set equal to $h_{kq}(m)$, to yield Equation [14] below:

$$\tilde{v}(n) = \sum_{k=0}^{K} \sum_{m=0}^{M} \sum_{q=0}^{\lfloor k/2 \rfloor} h_{kq}(m)\phi_{k,k-2q}(n-m) \quad [14]$$

From Equation [14], complex baseband FIR responses, as given by Equation [6], may be factored out to yield the expression of the pre-distorted complex baseband signal provided by Equation [7] above.

Figure 6:
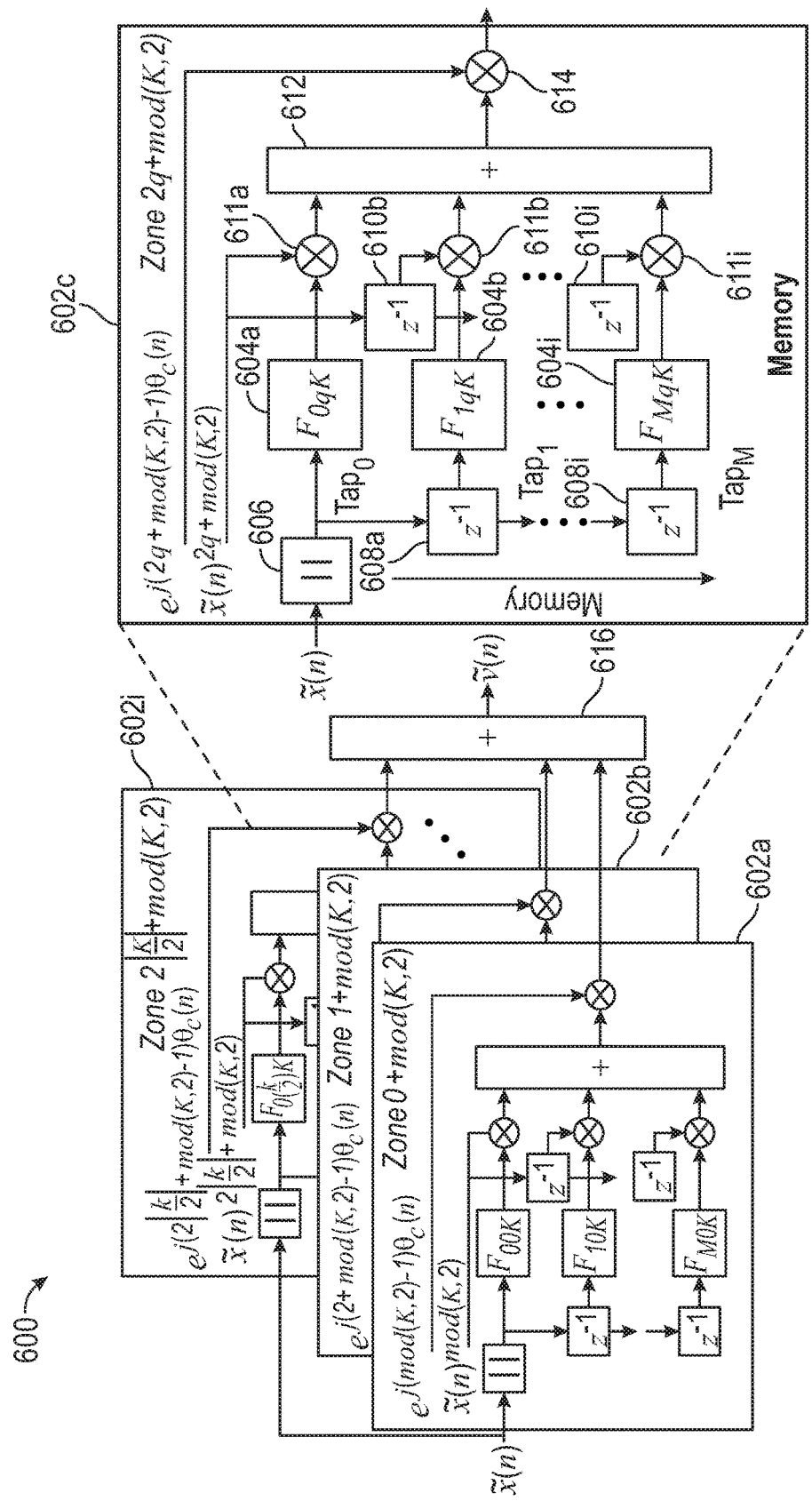
FIG. 6 is a diagram showing an example of a complex look-up table (LUT) bank that may be implemented by the DPD circuit, for example, in place of some or all of the polynomial approximation module of FIG. 4.

FIG. 6 is a diagram showing an example of a complex look-up table (LUT) bank 600 that may be implemented by the DPD circuit 102, for example, in place of some or all of the polynomial approximation module 202. For example, the complex LUT bank 600 may be an alternative mechanism for generating all or a component of the pre-distorted complex baseband signal $\tilde{v}(n)$. The complex LUT bank 600 may correct for either even or odd order distortions across one or more harmonic frequency zones (as explained below, multiple LUT banks 600 may be used in implementations that are to correct for both even and odd distortion terms). The complex LUT bank 600 may comprise stages 602a, 602b, 602c, 602n. Each stage 602a, 602b, 602c, 602n may generate a component of the pre-distorted complex baseband signal $\tilde{v}(n)$. The component generated by a stage 602a, 602b, 602c, 602n may be corrected for distortion terms in a harmonic frequency zone corresponding to the stage.

The complex LUT bank 600 may comprise a stage 602a, 602b, 602c, 602n for each value of q, where the values of q for a given complex LUT bank 600 are given by Equation [14] below:

$$q = \left(0, 1, 2, \ldots, \left\lfloor \frac{K}{2} \right\rfloor\right) \quad [15]$$

In Equation [15], K is the highest order distortion term to be corrected by the complex LUT bank 600. The harmonic frequency zone to which a given stage 602a, 602b, 602c, 602n is configured may be given by Equation [16] below:

Harmonic Frequency Zone = 2q + mod(K,2)   [16]

For example, if the complex LUT bank 600 is to correct for odd-ordered distortion terms of the 5$^{th}$ order or less, then K may be equal to 5. Values for q and corresponding zones for each stage are provided below at TABLE 3. Allowable values for q may be provided by Equation [14]. Corresponding harmonic frequency zones may be provided by Equation [16].

TABLE 3

| q | Harmonic Frequency Zone |
|---|---|
| 0 | 1 |
| 1 | 3 |
| 2 | 5 |

Accordingly, a complex LUT bank 600 for the example when K=5 may include a first stage for the 1$^{st}$ harmonic frequency zone (e.g., centered at $f_c$), a second stage for the 3$^{rd}$ harmonic frequency zone (e.g., centered at $3f_c$), and a third stage for the 5$^{th}$ harmonic frequency zone (e.g., centered at $5f_c$).

In some examples, the complex LUT bank 600 may be configured to correct for all distortion terms of orders meeting Equation [17] below:

mod(k,2) = mod(K,2)   [17]

For example, if K is odd, then the complex LUT bank 600 may be configured to correct for terms having orders k that are less than K and also odd. Also, for example, if K is even, then the complex LUT bank 600 may be configured to correct for terms having orders k that are less than K and also even. If the DPD circuit 102 is to correct for both even and odd order distortion terms, two complex LUT banks 600 may be included. For example, a first complex LUT bank may be configured with K equal to the highest order even distortion term to he corrected. A second complex LUT bank may be configured with K equal to the highest order odd distortion term to be corrected.

Components of the stage 602c are shown in FIG. 6 in detail to illustrate the operation of the stage 602c. Other stages 602a, 602b, 602i may include similar components. The stage 602c may comprise complex lookup tables (LUTs) 604a, 604b, 604i and complex multipliers 611a, 611b, 611n. The stage 602c may comprise M+1 complex LUTS 604a, 604b, 604i and M+1 complex multipliers 611a, 611b, 611n, wherein M is the memory depth of the stage 602c.

The stage 602c may receive the complex baseband signal $\tilde{x}(n)$ and may generate a harmonic frequency zone multiplier given by Equation [18] and a complex multiplier given by Equation [19]:

$$\tilde{x}(n)^{2q+mod(K,2)} \quad [18]$$

$$e^{j(2q+mod(K,2)-1)\theta_c(n)} \quad [19]$$

For example, both the harmonic frequency zone multiplier and the complex multiplier may be based on a harmonic frequency zone exponent, which may be found according to Equation [16] above.

A magnitude module 606 may find a magnitude $|\tilde{x}(n)|$ of the complex baseband signal $\tilde{x}(n)$. The magnitude $|\tilde{x}(n)|$ may be provided to a cascaded series of delay modules 608b, 608n, which may provide delayed magnitudes for the complex LUTs 604b, 604n. Each complex LUT 604a, 604b, 604i may receive a magnitude of the complex baseband signal. For example, a first complex LUT 604a at memory level zero may receive the magnitude $|\tilde{x}(n)|$ from the magnitude module 606. A second complex LUT 604b at memory level one may receive a magnitude $|\tilde{x}(n-1)|$ from the delay module 608b. The ith complex LUT 604i may receive a magnitude $|\tilde{x}(n-M)|$, where M is the memory depth. Each complex LUT 604a, 604b, 604i may select a LUT value $F_{mqK}\{|\tilde{x}(n)|\}$ based on the received magnitude. The LUT values, for example, may be given by Equation [20]:

$$F_{mqK}\{|\tilde{x}(n)|\} = \sum_{k=0}^{\lfloor \frac{K}{2} \rfloor - q} h_{kq}(m)|\tilde{x}(n)|^{2k} \quad [20]$$

As shown by Equation [18], the LUT value for a given magnitude may be a sum over the order of terms corrected by the complex LUT bank 600. LUT values for the respective complex LUTs 604a, 604b, 604i may be multiplied by the corresponding frequency zone multiplier at complex multipliers 611a, 611b, 611i. For example, the value of the frequency zone multiplier may be provided to a second set of cascaded delay modules 610a, 610b, 610i. Accordingly, each complex LUT value may be multiplied by a delayed version of the harmonic frequency zone multiplier, delayed by a number of samples equal to the memory depth of the complex LUT 604a, 604b, 604i. A summer 612 may sum the products of the complex multipliers 611a, 611b, 611i. The sum may be multiplied by the complex multiplier at 614, resulting in a harmonic frequency zone pre-distorted complex baseband signal for the harmonic frequency zone of the stage 602c, $\tilde{v}_{2q+mod(K,2)}(n)$. A summer 616 for the complex LUT bank 600 may sum the harmonic frequency zone pre-distorted complex baseband signals generated by the stages 602a, 602b, 602i, resulting in the pre-distorted baseband signal $\tilde{v}(n)$.

The LUT bank 600 may also be derived from the expression for the pre-distorted complex baseband signal $\tilde{v}(n)$ given above in Equation [14]. For example, Equation [14] may be reorganized as given below by Equation [21]:

$$\tilde{v}(n) = \sum_{m=0}^{M} \sum_{q=0}^{\lfloor \frac{K}{2} \rfloor} \sum_{k=0}^{\lfloor \frac{K}{2} \rfloor - q} h_{kq}(m)\varphi_{kq}(n-m) \quad [21]$$

In Equation [21], $\varphi_{kq}$ may be given by Equation [22] below:

$$\varphi_{kq}(n) = |\tilde{x}(n-m)|^{2K}\tilde{x}(n-m)^{2q+mod(K,2)}e^{j(2q+mod(k,2)-1)\theta_c(n-m)} \quad [22]$$

The delay in the NCO phase may be ignored, and $\theta_c(n-m)$ may be replaced by $\theta_c(n)$. This simplifications may result in a phase offset, which may be embedded into coefficients $h_{kq}(m)$ of Equation [21]. The pre-distorted complex baseband signal $\tilde{v}(n)$ may then be expressed as set forth below in Equation [23]:

$$\tilde{v}(n) = \sum_{m=0}^{M} \sum_{q=0}^{\lfloor \frac{K}{2} \rfloor} F_{mqK}\{|\tilde{x}(n)|\}\tilde{x}(n-m)^{2q+mod(K,2)}e^{j(2q+mod(K,2)-1)\theta_c(n)} \quad [23]$$

In Equation [23], $F_{mqK}\{|\tilde{x}(n)|\}$ may be given by Equation [20] above. As described above, the value $F_{mqK}\{|\tilde{x}(n)|\}$ may be implemented as a LUT with address $|\tilde{x}(n)|$ as the address for the LUT.

Figure 7:
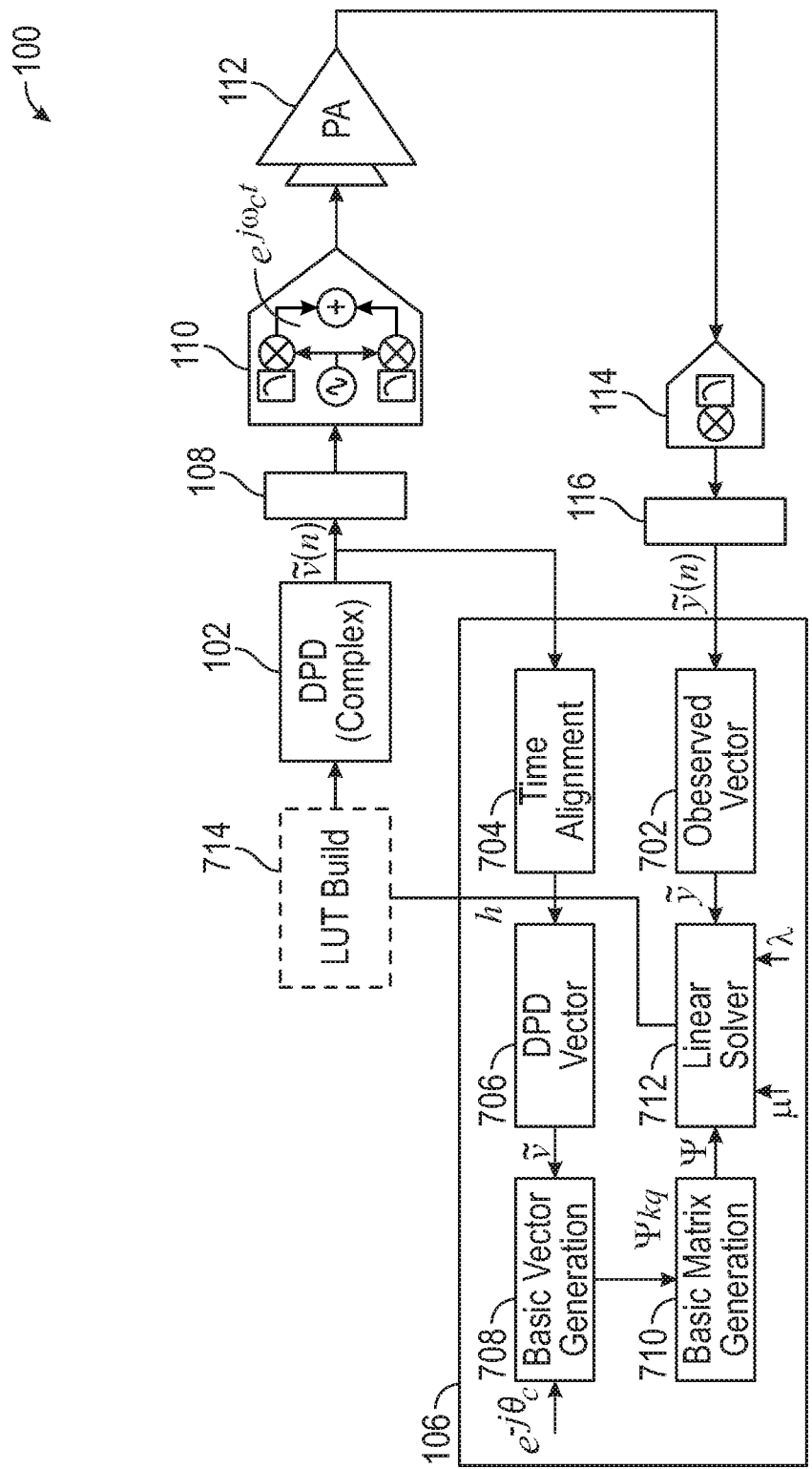
FIG. 7 is a diagram showing an example of the PA circuit of FIG. 1 including additional details of an example DPD adaption circuit.

FIG. 7 is a diagram showing an example of the PA circuit of FIG. 1 including additional details of an example DPD adaption circuit 106. An observed vector module 702 may receive the complex baseband feedback signal $\tilde{y}(n)$ and generate an observed vector $\tilde{y}$, given by Equation [24] below. The observed vector $\tilde{y}$ may include values of the complex baseband feedback signal:

$$\tilde{y} = [\tilde{y}_0, \tilde{y}_1, \ldots, \tilde{y}_{N-1}]^H \quad [24]$$

In Equation [24], the operator H indicates the Hermitian transpose. Similarly, a time alignment module 704 and DPD vector module 706 may generate a pre-distorted vector $\tilde{v}$ from the pre-distorted complex baseband signal $\tilde{v}(n)$. The pre-distorted complex baseband signal $\tilde{v}(n)$ may be delayed by the time alignment module 704. For example, time alignment module 704 may delay the pre-distorted baseband signal $\tilde{v}(n)$ by a delay time equivalent to the propagation delay of the pre-distorted baseband signal $\tilde{v}(n)$ through the communication link 108, the DAC 110, PA 112, ADC 114 and communications link 116. In this way the pre-distorted vector $\tilde{v}$ may align with the observed vector $\tilde{y}$. For example:

$$\tilde{v} = [\tilde{v}_0, \tilde{v}_1, \ldots, \tilde{v}_{N-1}]^H \quad [25]$$

The DPD vector module 706 may accumulate samples of the pre-distorted complex baseband signal $\tilde{v}(n)$ to form the pre-distorted vector $\tilde{v}$, for example, as indicated by Equation [25] above.

A basis vector generation module 608 may receive the pre-distorted vector $\tilde{v}$ and the carrier signal, given by $e^{-j\theta_c}$. With these inputs, the vector generation module 708 may generate a complex basis vectors $\psi_{kq}$ for values in the pre-distorted vector $\tilde{v}$. The complex basis vectors $\psi_{kq}$ may be given by Equation [26] below:

$$\psi_{kq} = [\varphi_{kq0}, \varphi_{kq1}, \ldots, \varphi_{kqM}] \quad [26]$$

As illustrated, elements of the complex basis vectors may be values for the complex basis functions $\varphi_{kq}$ at various memory depths m. The values for the complex basis functions $\varphi_{kq}$ may be found, for example, as indicated by Equation [27] below:

$$\varphi_{kq} = |\tilde{v}|^{2q}(\tilde{v}e^{j\theta_c})^{k-2q}e^{-j\theta_c} \quad [27]$$

The basis vector generation module 708 may provide the complex basis vectors $\psi_{kq}$ to a basis matrix generation module 710, which may aggregate the complex basis vectors $\psi_{kq}$ to generate a basis matrix $\Psi$, which may be given by Equation [28] below:

$$\Psi = [\psi_{11}, \psi_{12}, \ldots, \psi_{KQ}] \quad [28]$$

The basis matrix $\Psi$ and observed vector $\tilde{y}$ may be provided to a linear solver module 712. The linear solver module 712 may generate a DPD coefficient vector h, for example, as illustrated by Equation [29] below:

$$h \Rightarrow h + \mu(\Psi^H\Psi + \lambda I)^{-1}\Psi^H(y - \Psi h), \lambda > 0, \mu > 0 \quad [29]$$

In Equation [29], H indicates the Hermitian transpose operator; $\mu$ is a real scaler that may be chosen to trade off noise immunity against the adaption rate (e.g., the rate at which the DPD circuit is updated). The term $\lambda$ may be a regularization factor that may be chosen to improve the numerical conditioning of the calculations. The resulting coefficient matrix h may be given by Equation [30] below:

$$h = [h_{11}, h_{21}, \ldots, h_{KQ}] \quad [30]$$

The coefficient h may include DPD tap coefficients that may be used with the polynomial approximation module 202.

Figure 8:
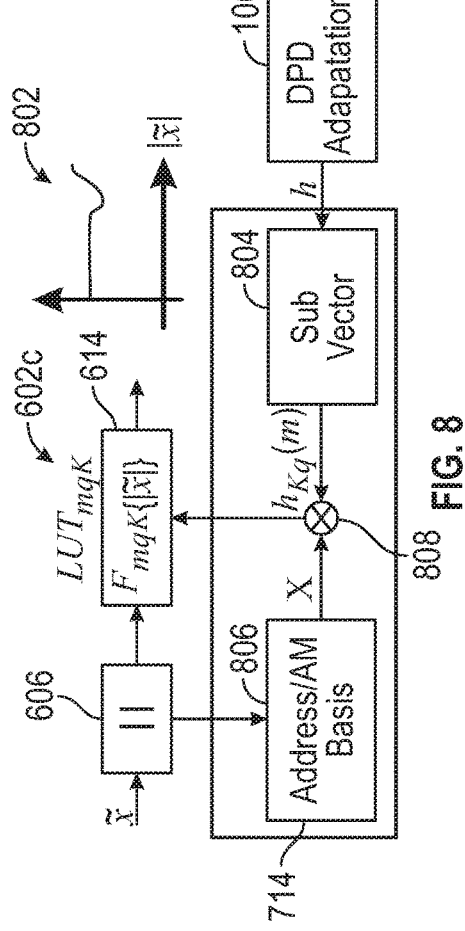
FIG. 8 is a diagram showing an example of the LUT builder module and portions of an example complex LUT stage.

In examples utilizing some or all of a complex LUT bank, such as 600, the PA circuit 100 may also include an LUT builder module 714. The LUT builder module 714 may be a component of the adaptation module 106 or an independent component. FIG. 8 is a diagram showing one example of the LUT builder module 714 and portions of an example complex LUT stage 602c. The LUT builder module 714 may receive the coefficient h. A sub vector module 804 may be configured to extract from the coefficient h a sub coefficient vector $h_{Kq}$ (m) for each harmonic frequency zone. For example, a sub coefficient vector $h_{Kq}$ (m) is given by Equation [31] below:

$$h_{Kq}(m) = \left[ h_{0q}(m), h_{1q}(m), \ldots, h_{\lfloor \frac{K}{2} \rfloor - q, q}(m), 0 \right] \quad [31]$$

Entries from $$\left\lfloor \frac{K}{2} \right\rfloor - q$$

to $$\left\lfloor \frac{K}{2} \right\rfloor$$

may be populated with zeros. An address/AM basis module 806 may be configured to generate an LUT address basis matrix X, given by Equation [32] below:

$$X = \left[ |\tilde{x}|^0 |\tilde{x}|^2 \ldots |\tilde{x}|^{\lfloor \frac{K}{2} \rfloor} \right] \quad [32]$$

The dimensions of the basis matrix may be the memory depth of the LUT by $$\left\lfloor \frac{K}{2} \right\rfloor.$$

In Equation [32], $|\tilde{x}|$ is the LUT address index ranging over the complex baseband amplitude. A multiplier 808 may generate the inner product of the basis matrix X and the sub coefficient vector $h_{Kq}(m)$. The result of the multiplier 808 may be used to populate the complex LUT 604a. Plot 802 shows examples for the multiplier values. Also, in some examples, LUT values may be given by Equation [33]:

$$F_{mqK}\{|\tilde{x}|\} = h_{Kq}(m)X \cong \sum_{k=0}^{\lfloor \frac{K}{2} \rfloor - q} h_{kq}(m)|\tilde{x}|^{2k} \quad [33]$$

Figure 9:
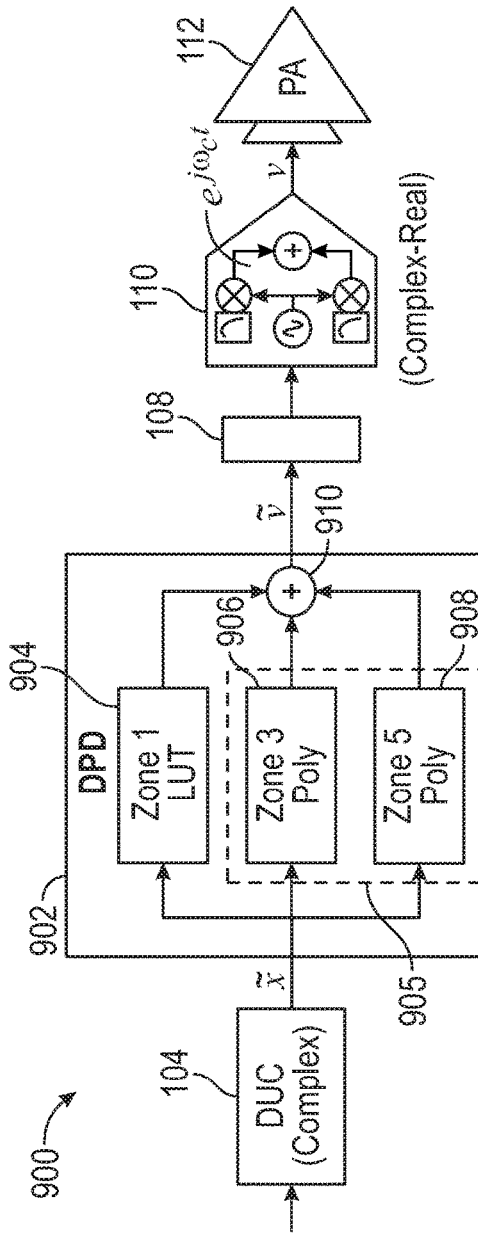
FIG. 9 is a diagram showing one example of a PA circuit implementing wideband predistortion with a hybrid DPD circuit.

FIG. 9 is a diagram showing an example of a PA circuit implementing wideband predistortion with a hybrid DPD circuit 902. The hybrid DPD circuit 902 may incorporate aspects of the polynomial approximation module 202 and of a complex LUT bank 600. For example, the hybrid DPD circuit 902 may implement one or more LUT nodes 904, such as 602a, 602b, 602i for one or more harmonic frequency zones. Remaining frequency zones may be corrected utilizing an FIR filter 905, similar to the FIR filter 205. For example, the FIR filter 905 may omit taps correcting for frequency zone terms that are otherwise corrected by the LUT node or nodes 904. For example, the FIR filter 205, which corrects for all harmonic frequency zones, may comprise taps with coefficients given by $$h_{k, \lfloor \frac{k}{2} \rfloor}.$$

The FIR filter 905 may have similar taps, but may omit taps with coefficients having $$\left\lfloor \frac{k}{2} \right\rfloor$$

values equal to a harmonic frequency zone already corrected by a LUT node, such as 904. In this way, the FIR filter 905 may correct for one or more harmonic frequency zones, such as 906 and 908. In some examples, it may be more efficient to use LUT nodes to correct for lower harmonic frequency zones while FIR filter terms may more efficiently correct for higher harmonic frequency zones.

In some examples, where the memory depth is minimal but the nonlinear order is high, it may be more efficient to implement the DPD circuit 102 utilizing a LUT. Conversely, in some examples where the order is low, but the memory deep, the nonlinear FIR filter example as described in FIG. 4 may be more efficient. In other examples, the mixed or hybrid approach of FIG. 9 is desirable.

Figure 10:
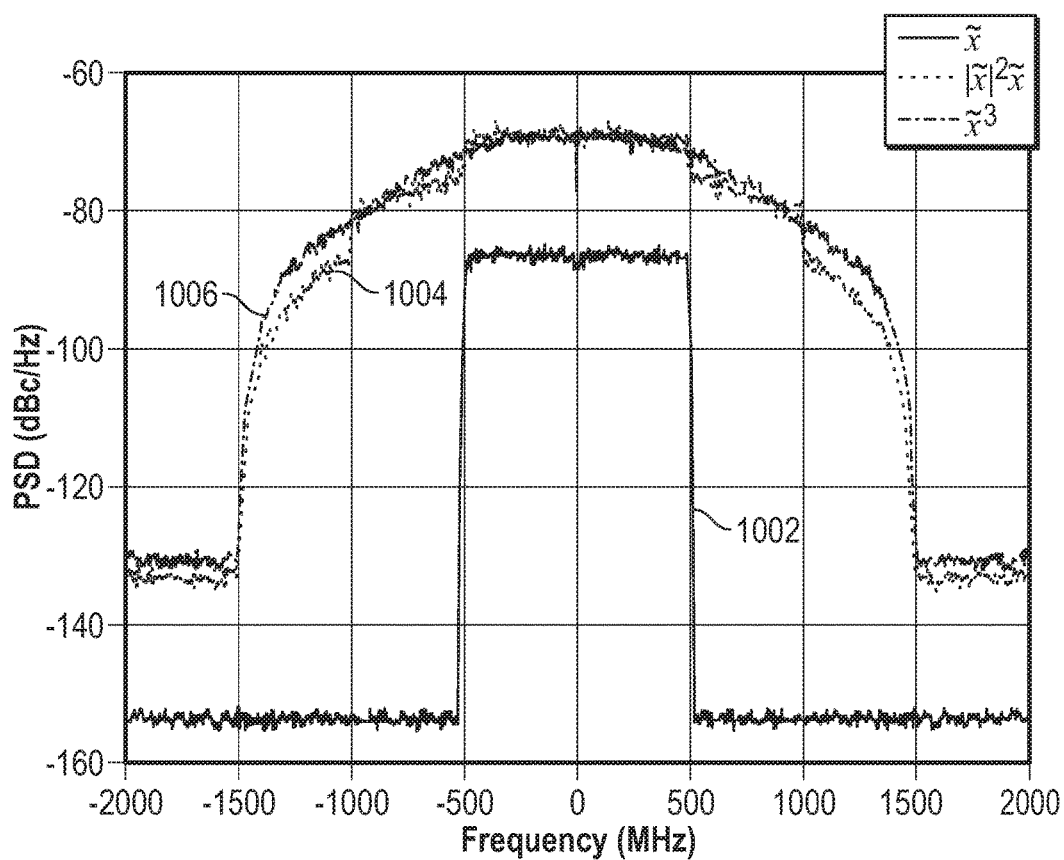
FIG. 10 is a chart showing an example of a bandwidth for a simulated complex baseband signal $\tilde{x}$, and expanded bandwidths for simulated basis function terms of the complex baseband signal $\tilde{x}$.

In some examples, the bandwidth of nonlinear correction terms used by the DPD circuit 102 may be larger than the bandwidth of the input signal (e.g., the complex baseband signal $\tilde{x}$) and the output signal (e.g., an output signal $\tilde{y}$). This effect may be referred to as bandwidth expansion. For example, when all or part of the polynomial approximation module 202 is used, the basis function terms $\varphi_{kq}$ may have a bandwidth that is an integer multiple of bandwidth of the complex baseband signal $\tilde{x}$. FIG. 10 is a chart showing an example of a bandwidth 1002 for a simulated complex baseband signal $\tilde{x}$, and expanded bandwidths 1004, 1006 for simulated basis function terms of the complex baseband signal $\tilde{x}$. As illustrated, the bandwidth of the example complex baseband signal $\tilde{x}$ is 1 GHz, from –500 MHz to 500 MHz. The bandwidth 1004 may correspond to a basis function for a third order distortion term in the first harmonic frequency zone, given by Equation [34] below:

$$\varphi_{3,1} \sim |\tilde{x}|^2 \tilde{x} \quad [34]$$

The bandwidth 1005 may correspond to a basis function for a third order distortion term in the third harmonic frequency zone, given by Equation [35] below:

$$\varphi_{3,3} \sim \tilde{x}^3 \quad [35]$$

Both basis functions $\varphi_{3,1}$ and $\varphi_{3,3}$ are proportional to $\tilde{x}^3$ and accordingly have a bandwidth that is about three times the bandwidth of the complex baseband signal. For example, both bandwidths 1004, 1006 are about 3 GHz, from –1.5 GHz to 1.5 GHz. Although the example of FIG. 10 shows increased bandwidth for basis functions of the polynomial approximation module, a similar effect may occur for internal signals of the LUT bank 600 such as, for example, outputs of the complex multipliers 611a, 611b, 611i of the various stages 602a, 602b, 602c, 602i.

Figure 11:
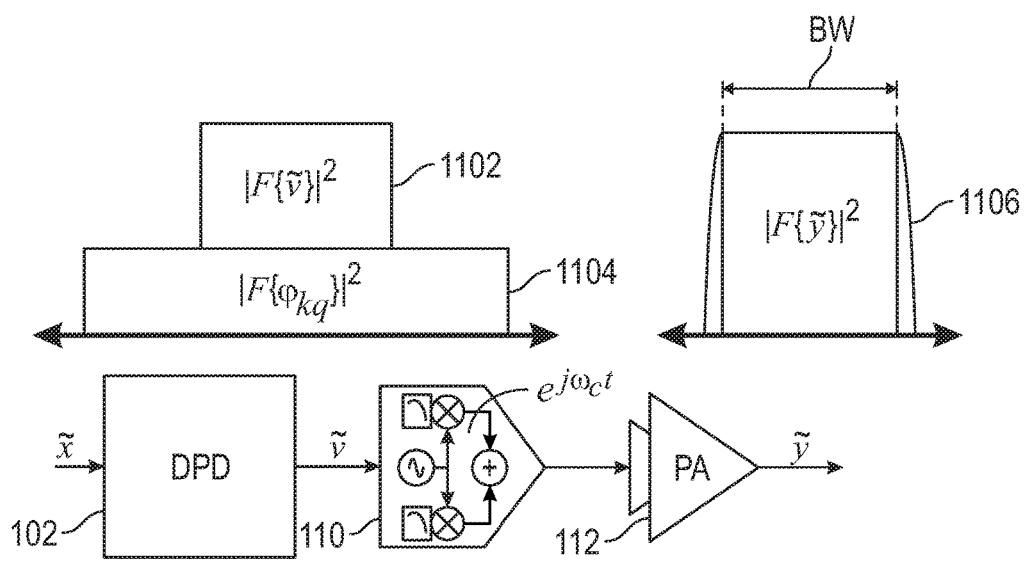
FIG. 11 is a diagram showing portions of the PA circuit of FIG. 1 with bandwidth charts to further illustrate the effect shown in FIG. 10.

FIG. 11 is a diagram showing portions of the PA circuit 100 with bandwidth charts 1102, 1104, 1106 to further illustrate the effect shown in FIG. 10. FIG. 11 shows a bandwidth 1102 of the pre-distorted complex baseband signal $\tilde{v}$, the bandwidth of the basis functions $\varphi_{kq}$ and the bandwidth of the output signal $\tilde{y}$. As shown, the bandwidth 1104 of the basis functions is roughly twice the bandwidths 1102, 1106 of pre-distorted complex baseband signal $\tilde{v}$ and the output signal $\tilde{y}$.

Figure 12:
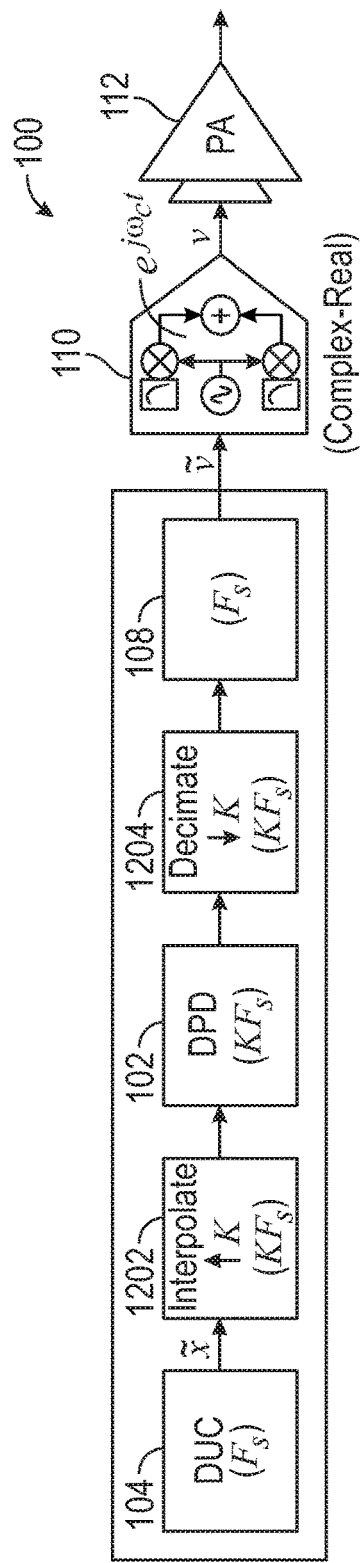
FIG. 12 shows a diagram of an example of the PA circuit of FIG. 1 configured to increase the sample rate at the DPD circuit.

Because the bandwidth of the basis function terms in the DPD circuit 102 are higher than either its input or its output, it may be necessary to increase the sample rate of (e.g., up-sample) the DPD circuit 102, for example, to avoid aliasing. FIG. 12 shows a diagram of one example of the PA circuit 100 configured to increase the sample rate at the DPD circuit 102. The example of the PA circuit 100 shown in FIG. 12 includes an interpolator circuit 1202 positioned to receive the complex baseband signal $\tilde{x}$ and provide to the DPD circuit 102 an up-sampled complex baseband signal. The up-sampled complex baseband signal may have an effective sampling frequency given by Equation [36]:

$$F_{US}=K\times F_S \qquad [36]$$

In Equation [37], Fus indicates the effective or up-sampled complex baseband signal sampling frequency. Fs is the original sampling frequency of the complex baseband signal $\tilde{x}$ and K is the highest order term to be corrected by the DPD circuit 102. The interpolator circuit 1202 may utilize any suitable interpolation or up -sampling technique. For example, for each sample n of the complex baseband signal $\tilde{x}$, the interpolator circuit 1202 may add K copies of the sample n to generate the interpolated complex baseband signal. The DPD circuit 102 may operate on the up-sampled complex baseband signal. In this way, the DPD circuit 102 may represent the full bandwidth of the basis functions and/or other intermediate values generated in the DPI circuit 102 (e.g., without aliasing due to undersampling).

Acting on the up-sampled complex baseband signal, the DPD circuit 102 may generate an up-sampled pre-distorted complex baseband signal at the sampling rate Fus. The up-sampled pre-distorted complex baseband signal may be provided to a decimator 1204, which may down-sample the up-sampled pre-distorted complex baseband signal to generate the pre-distorted baseband signal $\tilde{v}$. In some examples, the decimator circuit 1204, may, for every sample n of the up-sampled pre-distorted baseband signal, remove K−1 samples from the up-sampled pre-distorted baseband signal. Any suitable decimation or down-sampling technique may be used, however.

Figure 13:
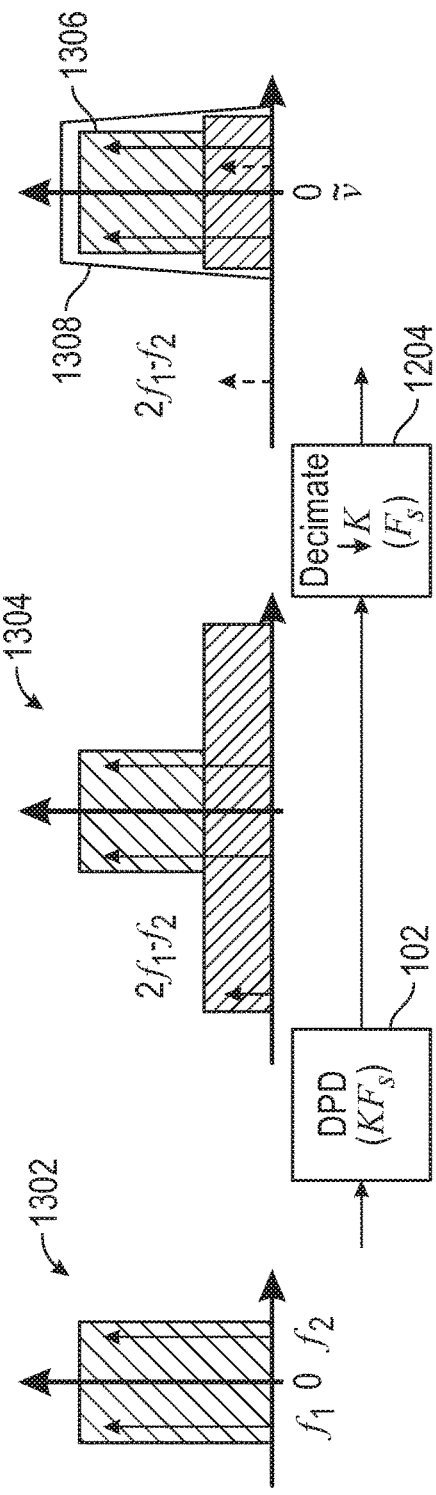
FIG. 13 shows an example of a use case of the DPD circuit and decimator circuit of FIG. 12 in which a real double side band term of the up-sampled pre-distorted complex baseband signal is inadvertently removed during decimation.

For some types of distortion terms, up-sampling the complex baseband signal $\tilde{x}$ and subsequently down-sampling the pre-distorted complex baseband signal $\tilde{v}$ may degrade the effectiveness of predistortion. For example, FIG. 13 shows an example use case of the DPD circuit 102 and decimator circuit 1204 showing how a real double side band term of the up-sampled pre-distorted complex baseband signal may be inadvertently removed during decimation. FIG. 13 includes a plot 1302 of the up-sampled complex baseband signal before provision to the DPD circuit 102, which in this example operates at the up-sampled frequency KFs. The up-sampled complex baseband signal may include real, double side band terms at $\pm pf_1$ and $\pm pf_2$. For example, a $3^{rd}$ order term having real double side band components at $2f_1-f_2$ and $-2f_1-f_2$ may be represented in complex mode by the single term $2f_1-f_2$, shown in 1304 of the up-sampled pre-distorted complex baseband signal. In some cases, this term can fall outside of the band represented by the original sampling frequency Fs, while the corresponding real double side band term of the pre-distorted complex baseband signal is still in-band. Accordingly, the correction term $2f_1-f_2$ may be lost after down-sampling but the corresponding real distortion term may remain. For example, complex out-of-band terms may be removed by the decimation. These complex out-of-band terms may correspond to real band terms and, therefore, their remove may compromise the operation of the DPD circuit 102.

Figure 14:
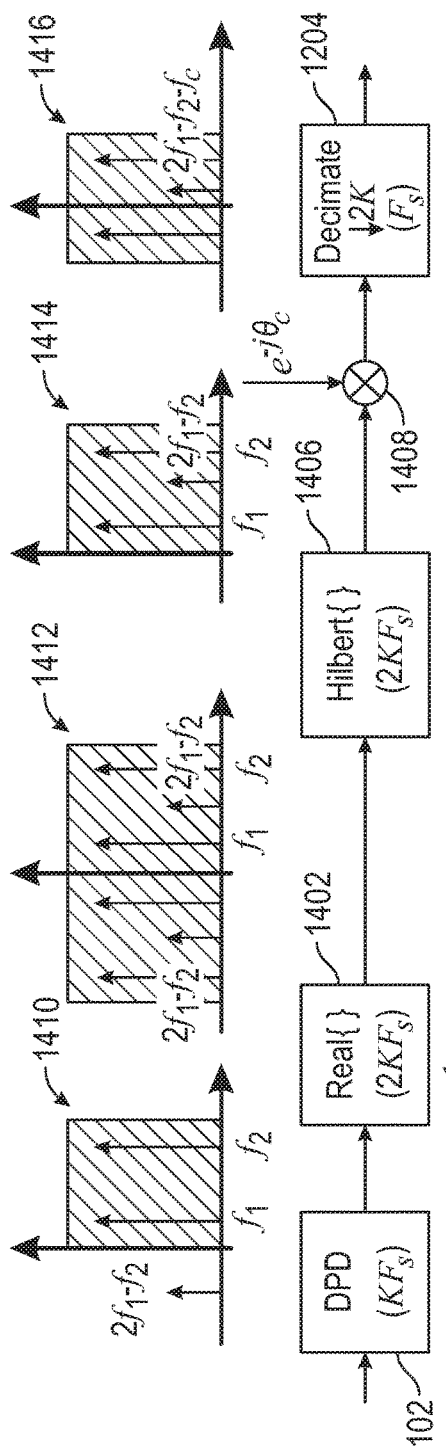
FIG. 14 is a diagram showing an example of the PA circuit of FIG. 1 including components for translating correction terms of the pre-distorted complex baseband signal into band.

FIG. 14 is a diagram showing an example of the PA circuit 100 including components for translating correction terms of the pre-distorted complex baseband signal into band. In the example of FIG. 14, the DPD circuit 102 may operate at the up-sampled frequency Kfs. A plot 1410 shows the up-sampled pre-distorted complex baseband signal illustrating an out-of-band sideband term $2f_1-f_2$. The up-sampled pre-distorted complex baseband signal generated by the DPD circuit 102 may be provided to a real transform circuit 1402, which may generate a real pre -distorted signal, shown by plot 1412.

In some examples, because the real transform circuit 1402 converts the up -sampled pre-distorted baseband signal to a real expression, it may also double the bandwidth to 2KFs, introducing negative frequency content. As illustrated by the plot 1412, the real pre-distorted signal includes the negative frequency correction term $2f_1-f_2$ of the up-sampled pre-distorted complex baseband and a positive frequency copy of the same correction term. The real pre-distorted signal may be provided to a Hilbert transform circuit 1406, which may find a Hilbert transform of the real pre-distorted signal. A Hilbert transform may return the complex or analytical equivalent of the input including positive frequency terms only. The result may be a corrected up-sampled pre-distorted signal, again at the up-sampled frequency KFs. The corrected up-sampled pre-distorted signal may be frequency translated by the carrier frequency at multiplier 1408, resulting in a corrected up -sampled pre-distorted baseband signal with the positive frequency terms translated to baseband. The corrected up-sampled pre-distorted complex baseband signal maybe provided to the decimator 1204, which may return the pre-distorted complex baseband signal.

Figure 15:
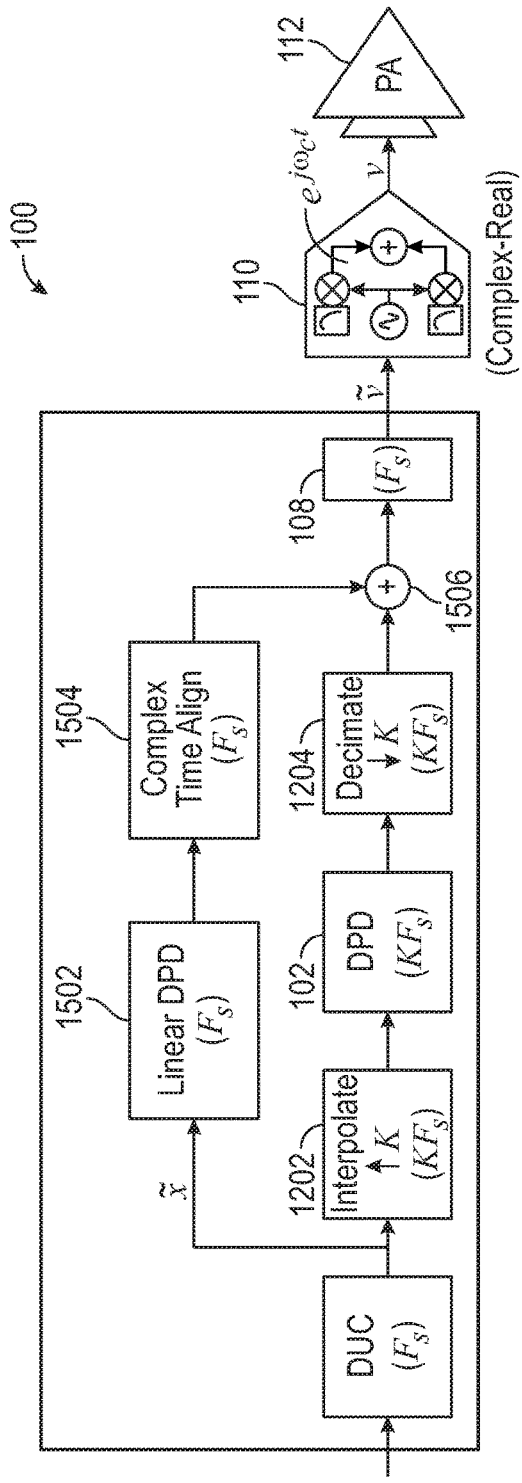
FIG. 15 is a diagram showing an example of the PA circuit including dual rate DPD paths.

FIG. 15 is a diagram showing an example of the PA circuit 100 including dual rate DPD paths. As described above, bandwidth expansion may occur for basis function terms (and other intermediate terms of the DPD circuit 102) as a function of the order of the terms. For example, $2^{nd}$ order terms may experience a bandwidth expansion equal to 2Fs, wherein Fs is the sampling frequency. Linear terms (e.g., $1^{st}$ order terms), however, may not experience any bandwidth expansion. Accordingly, in some examples, these terms may be processed at the sampling frequency without degrading the pre-distorted complex baseband signal. In the example of FIG. 15, the PA circuit 100 includes two DPD correction paths, each of which receives the complex baseband signal $\tilde{x}$.

A nonlinear path includes the interpolator circuit 1202, the DPD circuit 102 and the decimator circuit 1204, for example, as described with respect to FIG. 12. Because bandwidth expansion occurs for nonlinear terms (e.g., $2^{nd}$ order and higher), processing in the nonlinear path may be at an up-sampled frequency (e.g., OA In some examples, the nonlinear path may also include the real conversion circuit 1402 and Hilbert transform circuit 1406 as described at FIG. 14. In the example of FIG. 15, the DPD circuit 102 may be configured to generate correction terms that are of the $2^{nd}$ order and higher. For example, when the DPD circuit 102 implements all or part of a polynomial approximation module 202, the module 202 may be configured to exclude taps for first order terms (e.g., basis functions for which k=1). Similarly, in examples where the DPD circuit 102 implements all or part of a LUT bank 600, the stage for the first harmonic frequency zone may be omitted. An output of the nonlinear path (e.g., at the decimator circuit 1204) may be a nonlinear component of the pre-distorted complex baseband signal.

A linear path shown in FIG. 15 includes a linear DPD circuit 1502 and a complex time alignment circuit 1504. The linear DPD circuit 1502 may be configured to generate linear correction terms (e.g., correction terms of the $1^{st}$ order). For example, when the linear DPD circuit 1502 implements all or part of a polynomial approximation module 202, it may include only taps for first order terms (e.g., basis functions for which k=1). For example, the linear DPD circuit 1502 may include a single FIR filter with a single tap and/or a scalar gain. Similarly, in examples where the linear DPD circuit 1502 implements all or part of a LUT bank 600, only the stage for the first harmonic frequency zone may be included. An output of the linear path may be a linear component of the pre-distorted complex baseband signal, which may be summed with the non-linear component of the pre-distorted complex baseband signal at a summer 1506 to generate the pre-distorted complex baseband signal. The complex time alignment circuit 1504 may provide time delay and/or phase offset correction or rotation to align the output of the linear DPD circuit 1502 with the output of the nonlinear path DPD circuit.

The arrangement shown in FIG. 15 may provide benefits in certain examples. For example, because the linear portion of the signal is not subjected to the processing of the interpolator circuit 1202, decimator circuit 1204 and other components of the non-linear path, distortion or impairment of the non-linear portion of the pre-distorted complex baseband signal may be minimized. Also, in some examples, the arrangement of FIG. 15 may reduce the cost of implementing the non-linear path. For example, the decimator circuit 1204 can introduce aliasing into the pre-distorted complex baseband signal. Accordingly, the decimator circuit 1204 may include one or more anti-aliasing filters to remove aliasing images. Non-linear terms of the pre-distorted complex baseband signal, however, may have a magnitude that is about 30 dB less than the linear terms. As a result, the decimator circuit 1204 may be implemented with a lower-order filter.

Figure 16:
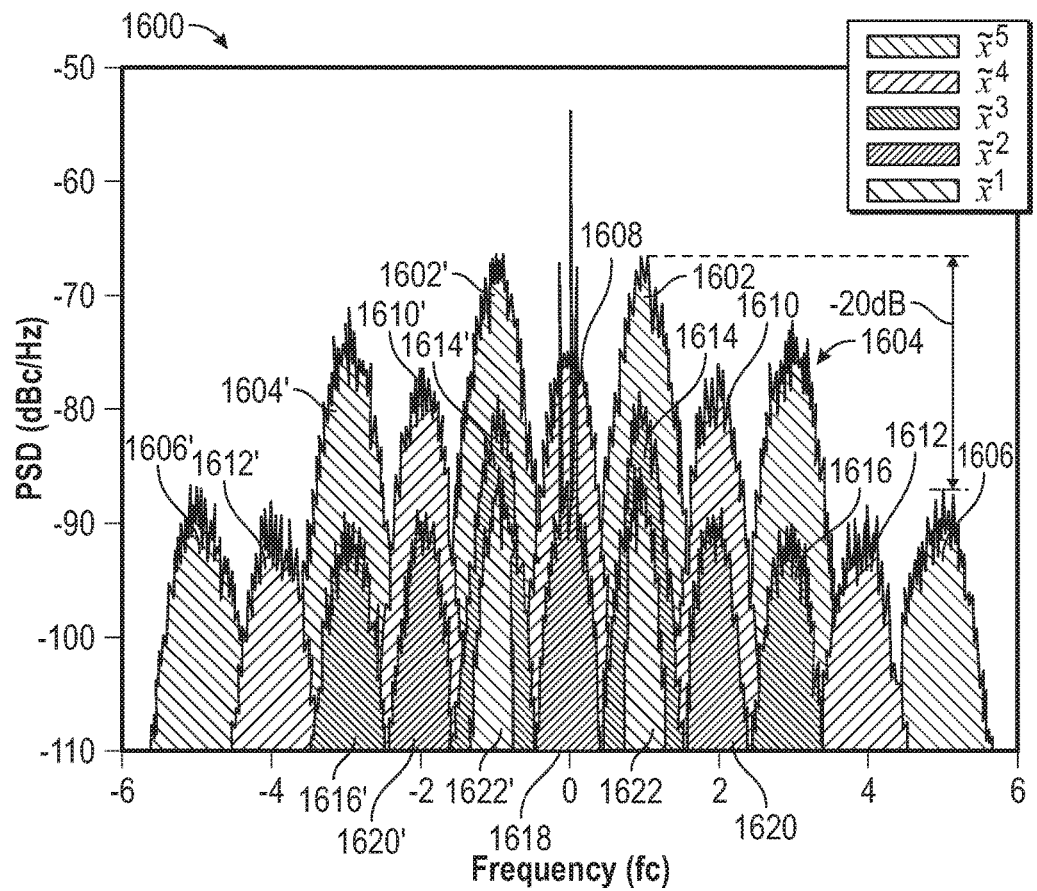
FIG. 16 is a plot showing an example of a power amplifier signal and distortion terms by frequency and power spectral density showing the relative magnitude of terms in different harmonic frequency zones.

In some examples, correction for higher-order harmonic frequency zones may be omitted without material degradation in the output signal. For example, FIG. 16 is a plot 1600 showing example power amplifier signal and distortion terms by frequency and power spectral density showing the relative magnitude of terms in different harmonic frequency zones. In FIG. 16, similar to FIG. 3, the vertical axis denotes power spectral density of the terms in decibels relative to the carrier per cycle per second (dBc/Hz). The plot 1600 shows $1^{st}$ order terms ($\tilde{x}^1$); $2^{nd}$ order terms ($\tilde{x}^2$); $3^{rd}$ order terms ($\tilde{x}^3$); $4^{th}$ order terms ($\tilde{x}^4$); and $5^{th}$ order terms ($\tilde{x}^5$). As shown in FIG. 3, $5^{th}$ order terms ($\tilde{x}^5$) may include a term 1602 in the first harmonic frequency zone, a term 1604 in the third harmonic frequency zone, and a term 1606 in the fifth harmonic frequency zone. The $4^{th}$ order terms ($\tilde{x}^4$) may include a term 1608 in the zeroth harmonic frequency zone, a term 1610 in the second harmonic frequency zone, and a term 1612 in the fourth harmonic frequency zone. The $3^{rd}$ order terms ($\tilde{x}^3$) may include a term 1614 in the first harmonic frequency zone and a term 1616 in the third harmonic frequency zone. The $2^{nd}$ order terms ($\tilde{x}^2$) may include a term 1618 at the zeroth harmonic frequency zone and a term 1620 at the second harmonic frequency zone. A first order term 1622 may be at the at the first order frequency zone. The plot 1600 also shows corresponding negative frequency terms 1602', 1604', 1606', 1608', 1610', 1612', 1614', 1616', 1618', 1620', 1622'.

Figure 17:
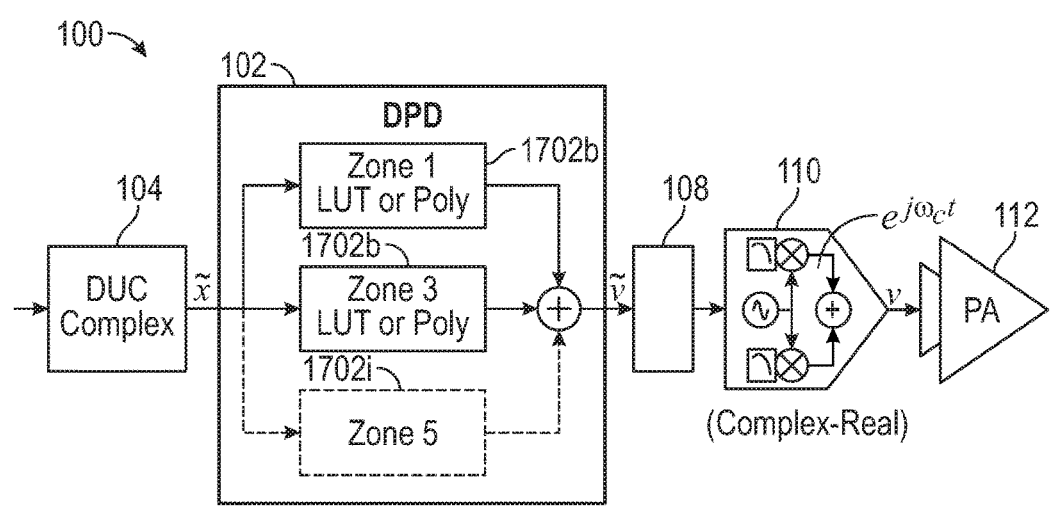
FIG. 17 is a diagram showing an example of the PA circuit of FIG. 1 including an example of a DPD circuit.

The plot 1600 illustrates that the magnitude of terms drops off in higher harmonic frequency zones. For example, the $5^{th}$ order term 1606 may have a magnitude 20 dB lower than the magnitude of the $5^{th}$ order term 1602 in the first harmonic frequency zone. Accordingly, in some examples, a PA circuit 100 may be configured to compensate for distortion terms of a particular order (e.g., $5^{th}$ order) while omitting compensation for the highest frequency term in the order. FIG. 17 is a diagram showing one example of the PA circuit 100 including an example of a DPD circuit 102. The example DPD circuit 102 comprises modules 1702a, 1702b, 1702i. Any suitable number of modules may be used. Each module 1702a, 1702b, 1702i may correspond to a harmonic frequency zone. For example, the modules 1702a, 1702b, 1702i may be LUT nodes, such as described with respect to FIG. 6 and/or FIR filters as described with respect to FIG. 4.

The modules 1702a, 1702b, 1702i may be configured to correct for less than all of the distortion terms of a particular order. For example, the modules 1702a, 1702b, 1702i may correct for at least some terms of an order higher than the highest harmonic frequency zone corrected for by the modules. For example, a DPD circuit 102 may include two modules, 1702a and 1702b. Module 1702a may correct for terms at the first harmonic frequency zone, including $5^{th}$ and $3^{rd}$ order terms. Module 1702b may correct for terms at the third harmonic frequency zone, including $5^{th}$ and $3^{rd}$ order terms. Additional modules correcting for higher harmonic frequency zones may be omitted or disabled. In this example, the $5^{th}$ order term in the fifth harmonic frequency zone is not corrected. For example, the $5^{th}$ order term in the fifth harmonic frequency zone may have a magnitude significantly lower than the other $5^{th}$ order terms in the first and third harmonic frequency zones. The modules 1702a, 1702b, 1702i may also be configured for other frequency zone and distortion term combinations. In another example, the modules 1702a, 1702b 1702i may be configured to correct for $4^{th}$ order terms in the zeroth and second harmonic frequency zones while omitting correction for the $4^{th}$ order term in the fourth harmonic frequency zone. In another example, the modules 1702a, 1702b, 1702i may be configured to correct for $6^{th}$ order terms in the zeroth, second, and fourth harmonic frequency zones while omitting correction for the $6^{th}$ order term in the sixth harmonic frequency zone. In yet another example, the modules 1702a, 1702b, 1702i may be configured to correct for $7^{th}$ order terms in the first, third and fifth harmonic frequency zones while omitting correction for the $7^{th}$ order term in the seventh harmonic frequency zone.

Various Notes & Examples

Example 1 is a system comprising: a digital pre-distortion circuit programmed to: receive a complex baseband signal; and generate a pre-distorted signal, the generating of the pre-distorted signal comprising: applying to the complex baseband signal a first correction for an Nth order distortion of a power amplifier at an Ith harmonic frequency zone centered at about an Ith harmonic of a carrier frequency; and applying to the complex baseband signal a second correction for the Nth order distortion at a Jth harmonic frequency zone centered at about a Jth harmonic of the carrier frequency different than the Ith harmonic of a carrier frequency.

In Example 2, the subject matter of Example 1 optionally includes wherein the digital pre-distortion circuit is further programmed to: determine a value for a first complex basis function for the Nth order distortion at the Ith harmonic frequency zone based at least in part on the complex baseband signal; determine a value for a second complex basis function for the Nth order distortion at the Ith harmonic frequency zone based at least in part on the complex baseband signal; apply a first finite impulse response (FIR) filter to generate a first FIR response based at least in part on the value for the first complex basis function; and apply a second FIR filter to generate a second FIR response based at least in part on the value for the second complex basis function.

In Example 3, the subject matter of Example 2 optionally includes wherein the digital pre-distortion circuit is further programmed to before determining the value for the first complex basis function, translate the first complex basis function by the carrier frequency.

In Example 4, the subject matter of any one or more of Examples 2-3 optionally include wherein the digital pre-distortion circuit is further programmed to: receive a complex feedback signal based at least in part on an output of the power amplifier; compare the complex feedback signal to the pre-distorted signal; and determine a coefficient for the first FIR filter based at least in part on the compare of the complex feedback signal to the pre-distorted signal.

In Example 5, the subject matter of any one or more of Examples 2-4 optionally include wherein the digital pre-distortion circuit is further programmed to: receive a complex feedback signal based at least in part on an output of the power amplifier; generate a feedback matrix based at least in part on the complex feedback signal; generate an Ith harmonic frequency zone basis vector comprising a first plurality of complex basis function values, the first plurality of complex basis function values comprising the value for the first complex basis function; generate a Jth harmonic frequency zone basis vector comprising a second plurality of complex basis function values, the second plurality of complex basis function values comprising the value for the second complex basis function; generate a basis matrix comprising the first frequency zone basis vector and the second frequency zone basis vector; compare the basis matrix to the feedback matrix; and determine a coefficient for the first FIR filter based at least in part on the compare of the basis matrix to the feedback matrix.

In Example 6, the subject matter of any one or more of Examples 2-5 optionally include wherein the value for the first complex basis function is based at least in part on a first value of the complex baseband signal at a first time, wherein the digital pre-distortion circuit is further programmed to: apply a first tap of the first FIR filter to the first value of the complex baseband signal at the first time; and apply a second tap of the first FIR filter to a second value of the complex baseband signal at a second time that is before the first time.

In Example 7, the subject matter of any one or more of Examples 1-6 optionally include wherein the digital pre-distortion circuit is further programmed to: determine a first magnitude of the complex baseband signal at a first time; for the Ith harmonic frequency zone: generate an Ith harmonic frequency zone exponent based at least in part on an the Nth order distortion of the power amplifier; generate an Ith harmonic frequency zone multiplier for the first time based at least in part on the Ith harmonic frequency zone exponent; select a first look up table (LUT) value from a first tap LUT of the Ith harmonic frequency zone based at least in part on the first magnitude of the complex baseband signal; generate a first tap LUT product for the Ith harmonic frequency zone based at least in part on the first LUT value and the Ith harmonic frequency zone multiplier for the first time; and generate an Ith harmonic frequency zone output based at least in part on the first tap LUT product for the Ith harmonic frequency zone and an Ith harmonic frequency zone carrier component; for the Jth harmonic frequency zone: generate a Jth harmonic frequency zone exponent based at least in part on the Nth order distortion of the power amplifier; generate a Jth harmonic frequency zone multiplier based at least in part on the Jth harmonic frequency zone exponent; select a second LUT value from a first tap LUT of the Jth harmonic frequency zone based at least in part on the first magnitude of the complex baseband signal; generating a first tap LUT product for the Jth harmonic frequency zone based at least in part on the second LUT value and the Jth harmonic frequency zone multiplier; and generate a Jth harmonic frequency zone output based at least in part on the first tap LUT product for the Jth harmonic frequency zone and a Jth harmonic frequency zone carrier component.

In Example 8, the subject matter of Example 7 optionally includes wherein the generate of the Ith harmonic frequency zone multiplier for the first time comprises raising a first value of the complex baseband signal at the first time to the Ith harmonic frequency zone exponent.

In Example 9, the subject matter of any one or more of Examples 7-8 optionally include wherein the generate of the first tap LUT product for the Ith harmonic frequency zone comprises multiplying the first LUT value and the Ith harmonic frequency zone multiplier.

In Example 10, the subject matter of any one or more of Examples 7-9 optionally include wherein the digital pre-distortion circuit is further programmed to, for the Ith harmonic frequency zone: determine a second magnitude of the complex baseband signal at a second time before the first time; generate an Ith harmonic frequency zone multiplier for the second time based at least in part on the Ith harmonic frequency zone exponent and a second value of the complex baseband signal at the second time; select a third look up table (LUT) value from a second tap LUT of the Ith harmonic frequency zone based at least in part on the second magnitude of the complex baseband signal; and generate a second tap LUT product for the Ith harmonic frequency zone based at least in part on the third LUT value and the Ith harmonic frequency zone multiplier for the second time, wherein the Ith harmonic frequency zone output is also based at least on part on the second tap LUT product.

In Example 11, the subject matter of any one or more of Examples 7-10 optionally include wherein the digital pre-distortion circuit is further programmed to: receive a complex feedback signal based at least in part on an output of the power amplifier; compare the complex feedback signal to the pre-distorted signal; and populate the first tap LUT based at least in part on the comparing.

In Example 12, the subject matter of any one or more of Examples 1-11 optionally include wherein the digital pre-distortion circuit is further programmed to: generate an Ith harmonic frequency zone exponent for the Ith harmonic frequency zone based at least in part on the Nth order distortion of the power amplifier; generate a Ith harmonic frequency zone multiplier based at least in part on the Ith harmonic frequency zone exponent; select a LUT value from a first tap LUT of the Ith harmonic frequency zone based at least in part on a first magnitude of the complex baseband signal at a first time; generate a first tap LUT product for the Ith harmonic frequency zone based at least in part on the LUT value and the Ith harmonic frequency zone multiplier; and generate an Ith harmonic t frequency zone output based at least in part on the first tap LUT product for the Ith harmonic frequency zone and an Ith harmonic frequency zone carrier component; determine a value for a first complex basis function for the Nth order distortion of the power amplifier at a Jth harmonic frequency zone, wherein the first complex basis function is based at least in part on the complex baseband signal; and apply a first finite impulse response (FIR) filter to generate a first FIR response based at least in part on the value for the first complex basis function.

In Example 13, the subject matter of any one or more of Examples 1-12 optionally include wherein the digital pre-distortion circuit is further programmed to up-sample the complex baseband signal to generate an up-sampled complex baseband signal, wherein the applying of the first correction and the applying of the second correction is based at least in part on the up-sampled baseband signal.

In Example 14, the subject matter of any one or more of Examples 1-13 optionally include wherein the digital pre-distortion circuit is further programmed to: up-sample the complex baseband signal to an up-sampled frequency generate an up-sampled complex baseband signal, wherein the pre-distorted signal is at the up -sampled frequency; determine a real component of the pre-distorted signal; and apply a Hilbert transform to the real component of the pre-distorted signal.

In Example 15, the subject matter of any one or more of Examples 1-14 optionally include wherein the generating of the pre-distorted signal further comprises: up-sampling the complex baseband signal to generate an up-sampled complex baseband signal, wherein the applying the first correction and the applying the second correction are based at least in part on the up-sampled complex baseband signal; and applying to the complex baseband signal a third correction for a 1st order term of the power amplifier at a Kth harmonic frequency zone centered at the carrier frequency based at least in part on the complex baseband signal.

In Example 16, the subject matter of any one or more of Examples 1-15 optionally include wherein the Jth harmonic frequency zone is the highest frequency zone corrected by the digital pre-distortion circuit, and wherein N is greater than J.

Example 17 is a method comprising: receiving a complex baseband signal; and generating a pre-distorted signal, wherein the generating comprises: applying to the complex baseband signal a first correction for an Nth order distortion of a power amplifier at an Ith harmonic frequency zone centered at about an Ith harmonic of a carrier frequency; and applying to the complex baseband signal a second correction for the Nth order distortion at a Jth harmonic frequency zone centered at about a Jth harmonic of the carrier frequency different than the Ith harmonic of a carrier frequency.

In Example 18, the subject matter of Example 17 optionally includes determining a value for a first complex basis function for the Nth order distortion at the Ith harmonic frequency zone based at least in part on the complex baseband signal; determining a value for a second complex basis function for the Nth order distortion at the Ith harmonic frequency zone based at least in part on the complex baseband signal; applying a first finite impulse response (FIR) filter to generate a first FIR response based at least in part on the value for the first complex basis function; and applying a second FIR filter to generate a second FIR response based at least in part on the value for the second complex basis function.

In Example 19, the subject matter of any one or more of Examples 17-18 optionally include determining a first magnitude of the complex baseband signal at a first time; for the Ith harmonic frequency zone: generating an Ith harmonic frequency zone exponent based at least in part on an the Nth order distortion of the power amplifier; generating an Ith harmonic frequency zone multiplier for the first time based at least in part on the Ith harmonic frequency zone exponent; selecting a first look up table (LUT) value from a first tap LUT of the Ith harmonic frequency zone based at least in part on the first magnitude of the complex baseband signal; generating a first tap LUT product for the Ith harmonic frequency zone based at least in part on the first LUT value and the Ith harmonic frequency zone multiplier for the first time; and generating an Ith harmonic frequency zone output based at least in part on the first tap LUT product for the Ith harmonic frequency zone and an Ith harmonic frequency zone carrier component; for the Jth harmonic frequency zone: generating a Jth harmonic frequency zone exponent based at least in part on the Nth order distortion of the power amplifier generating a Jth harmonic frequency zone multiplier based at least in part on the Jth harmonic frequency zone exponent; selecting a second LUT value from a first tap LUT of the Jth harmonic frequency zone based at least in part on the first magnitude of the complex baseband signal; generating a first tap LUT product for the Jth harmonic frequency zone based at least in part on the second LUT value and the Jth harmonic frequency zone multiplier; and generating a Jth harmonic frequency zone output based at least in part on the first tap LUT product for the Jth harmonic frequency zone and a Jth harmonic frequency zone carrier component.

In Example 20, the subject matter of any one or more of Examples 17-19 optionally include generating an Ith harmonic frequency zone exponent for the Ith harmonic frequency zone based at least in part on the Nth order distortion of the power amplifier; generating a Ith harmonic frequency zone multiplier based at least in part on the Ith harmonic frequency zone exponent; selecting a LUT value from a first tap LUT of the Ith harmonic frequency zone based at least in part on a first magnitude of the complex baseband signal at a first time; generating a first tap LUT product for the Ith harmonic frequency zone based at least in part on the LUT value and the Ith harmonic frequency zone multiplier; and generating an Ith harmonic t frequency zone output based at least in part on the first tap LUT product for the Ith harmonic frequency zone and an Ith harmonic frequency zone carrier component; determining a value for a first complex basis function for the Nth order distortion of the power amplifier at a Jth harmonic frequency zone, wherein the first complex basis function is based at least in part on the complex baseband signal; and applying a first finite impulse response (FIR) filter to generate a first FIR response based at least in part on the value for the first complex basis function.

The above detailed description includes references to the accompanying drawings, which form a part of the detailed description. The drawings show, by way of illustration specific embodiments in which the invention can be practiced. These embodiments are also referred to herein as "examples," Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) still encompassed by this description.

The term "circuit" can include a dedicated hardware circuit, a general-purpose microprocessor, digital signal processor, or other processor circuit, and may be structurally configured from a general purpose circuit to a specialized circuit such as using firmware or software.

Any one or more of the techniques (e.g., methodologies) discussed herein may be performed on a machine. In various embodiments, the machine may operate as a standalone device or may be connected (e.g., networked) to other machines. In a networked deployment, the machine may operate in the capacity of a server machine, a client machine, or both in server-client network environments. In an example, the machine may act as a peer machine in peer-to-peer (P2P) (or other distributed) network environment. The machine may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions can enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Particular implementations of the systems and methods described herein may involve use of a machine (e.g., computer system) that may include a hardware processor (e.g., a central processing unit (CPU), a graphics processing unit (GPU), a hardware processor core, or any combination thereof), a main memory and a static memory, some or all of which may communicate with each other via an interlink (e.g., bus). The machine may further include a display unit, an alphanumeric input device (e.g., a keyboard), and a user interface (UI) navigation device (e.g., a mouse). In an example, the display unit, input device and UI navigation device may be a touch screen display. The machine may additionally include a storage device (e.g., drive unit), a signal generation device (e.g., a speaker), a network interface device, and one or more sensors, such as a global positioning system (GPS) sensor, compass, accelerometer, or other sensor. The machine may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device may include a machine readable medium on which is stored one or more sets of data structures or instructions (e.g., software) embodying or utilized by any one or more of the techniques or functions described herein. The instructions may also reside, completely or at least partially, within the main memory, within static memory, or within the hardware processor during execution thereof by the machine. In an example, one or any combination of the hardware processor, the main memory, the static memory, or the storage device may constitute machine readable media.

While the machine readable medium can include a single medium, the term "machine readable medium" may include a single medium or multiple media (e.g., a centralized or distributed database, and/or associated caches and servers) configured to store the one or more instructions.

The term "machine readable medium" may include any medium that is capable of storing, encoding, or carrying instructions for execution by the machine and that cause the machine to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD -ROM disks.

The instructions may further be transmitted or received over a communications network using a transmission medium via the network interface device utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device may include one or more physical jacks (e.g., Ethernet, coaxial, or phone jacks) or one or more antennas to connect to the communications network. In an example, the network interface device may include a plurality of antennas to wirelessly communicate using at least one of single-input multiple-output (SIMO), multiple-input multiple-output (MIMO), or multiple-input single -output (MISO) techniques. The term "transmission medium" shall be taken to include any intangible medium that is capable of storing, encoding or carrying instructions for execution by the machine, and includes digital or analog communications signals or other intangible medium to facilitate communication of such software.

Method examples described herein can be machine or computer -implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non -volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A system comprising:
   a digital pre-distortion circuit configured to:
   receive a complex baseband signal; and
   generate a pre-distorted signal, the generating of the pre-distorted signal comprising:
   applying to the complex baseband signal a first correction for an $N^{th}$ order distortion of a power amplifier at an $I^{th}$ harmonic frequency zone centered at about an $I^{th}$ harmonic of a carrier frequency; and
   applying to the complex baseband signal a second correction for the $N^{th}$ order distortion at a $J^{th}$ harmonic frequency zone centered at about a $J^{th}$ harmonic of the carrier frequency different than the $I^{th}$ harmonic of the carrier frequency.

2. The system of claim 1, wherein the digital pre-distortion circuit is further configured to:
   determine a value for a first complex basis function for the $N^{th}$ order distortion at the $I^{th}$ harmonic frequency zone based at least in part on the complex baseband signal;
   determine a value for a second complex basis function for the $N^{th}$ order distortion at the $I^{th}$ harmonic frequency zone based at least in part on the complex baseband signal;
   apply a first filter to generate a first filter response based at least in part on the value for the first complex basis function; and
   apply a second filter to generate a second filter response based at least in part on the value for the second complex basis function.

3. The system of claim 2, wherein the digital pre-distortion circuit is further configured to before determining the value for the first complex basis function, translate the first complex basis function by the carrier frequency.

4. The system of claim 2, wherein the digital pre-distortion circuit is further configured to:
   receive a complex feedback signal based at least in part on an output of the power amplifier;
   compare the complex feedback signal to the pre-distorted signal; and
   determine a coefficient for the first filter based at least in part on the compare of the complex feedback signal to the pre-distorted signal.

5. The system of claim 2, wherein the digital pre-distortion circuit is further configured to:
   generate a feedback matrix based at least in part on a complex feedback signal;

generate a first an harmonic frequency zone basis vector based at least in part on the value for the first complex basis function;

generate a second harmonic frequency zone basis vector based at least in part on the value for the second complex basis function;

generate a basis matrix comprising the first frequency zone basis vector and the second frequency zone basis vector;

determine a coefficient for the first filter based at least in part on the basis matrix to the feedback matrix.

6. The system of claim 2, wherein the value for the first complex basis function is based at least in part on a first value of the complex baseband signal at a first time, wherein the digital pre-distortion circuit is further configured to:

apply a first tap of the first filter to the first value of the complex baseband signal at the first time; and apply a second tap of the first filter to a second value of the complex baseband signal at a second time that is before the first time.

7. The system of claim 1, wherein the digital pre-distortion circuit is further configured to:

determine a first magnitude of the complex baseband signal at a first time;

generate an $I^{th}$ harmonic frequency zone output based at least in part on a first LUT value from a first tap LUT; and generate a Jth harmonic frequency zone output based at least in part on a second LUT value from the first tap LUT.

8. The system of claim 1, wherein the digital pre-distortion circuit is further configured to:

generate an $I^{th}$ harmonic frequency zone exponent for the $I^{th}$ harmonic frequency zone based at least in part on the $N^{th}$ order distortion of the power amplifier;

generate a $I^{th}$ harmonic frequency zone multiplier based at least in part on the harmonic frequency zone exponent;

select a LUT value from a first tap LUT of the $I^{th}$ harmonic frequency zone based at least in part on a first magnitude of the complex baseband signal at a first time;

generate a first tap LUT product for the $I^{th}$ harmonic frequency zone based at least in part on the LUT value and the $I^{th}$ harmonic frequency zone multiplier; and generate an $I^{th}$ harmonic t frequency zone output based at least in part on the first tap LUT product for the $I^{th}$ harmonic frequency zone and an $I^{th}$ harmonic frequency zone carrier component;

determine a value for a first complex basis function for the $N^{th}$ order distortion of the power amplifier at a $J^{th}$ harmonic frequency zone, wherein the first complex basis function is based at least in part on the complex baseband signal; and apply a first filter to generate a first response based at least in part on the value for the first complex basis function.

9. The system of claim 1, wherein the digital pre-distortion circuit is further configured to up-sample the complex baseband signal to generate an up-sampled complex baseband signal, wherein the applying of the first correction and the applying of the second correction is based at least in part on the up-sampled baseband signal.

10. The system of claim 1, wherein the digital pre-distortion circuit is further configured to:

up-sample the complex baseband signal to an up-sampled frequency generate an up-sampled complex baseband signal, wherein the pre-distorted signal is at the up-sampled frequency;

determine a real component of the pre-distorted signal; and apply a Hilbert transform to the real component of the pre-distorted signal.

11. The system of claim 1, wherein the generating of the pre-distorted signal further comprises:

up-sampling the complex baseband signal to generate an up-sampled complex baseband signal, wherein the applying the first correction and the applying the second correction are based at least in part on the up-sampled complex baseband signal; and applying to the complex baseband signal a third correction for a $1^{st}$ order term of the power amplifier at a $K^{th}$ harmonic frequency zone centered at the carrier frequency based at least in part on the complex baseband signal.

12. The system of claim 1, wherein the $J^{th}$ harmonic frequency zone is the highest frequency zone corrected by the digital pre-distortion circuit, and wherein N is greater than J.

13. The system of claim 7, wherein the digital pre-distortion circuit is further configured to:

receive a complex feedback signal based at least in part on an output of the power amplifier;

compare the complex feedback signal to the pre-distorted signal; and populate the first tap LUT based at least in part on the comparing.

14. The system of claim 7, wherein the digital-pre-distortion circuit is further configured to:

generated an $I^{th}$ harmonic frequency zone exponent based at least in part on an the $N^{th}$ order distortion of the power amplifier;

generated an $I^{th}$ harmonic frequency zone multiplier for the first time based at least in part on the $I^{th}$ harmonic frequency zone exponent;

select the first LUT value from a first tap LUT of the $I^{th}$ harmonic frequency zone based at least in part on the first magnitude of the complex baseband signal; and generate a first tap LUT product for the $I^{th}$ harmonic frequency zone based at least in part on the first LUT value and the $I^{th}$ harmonic frequency zone multiplier for the first time, wherein the $I^{th}$ harmonic frequency zone output is based at least in part on the first tap LUT product for the $I^{th}$ harmonic frequency zone and an $I^{th}$ harmonic frequency zone carrier component.

15. The system of claim 14, wherein the generate of the $I^{th}$ harmonic frequency zone multiplier for the first time comprises raising a first value of the complex baseband signal at the first time to the $I^{th}$ harmonic frequency zone exponent.

16. The system of claim 14, wherein the generate of the first tap LUT product for the $I^{th}$ harmonic frequency zone comprises multiplying the first LUT value and the harmonic frequency zone multiplier.

17. The system of claim 14, wherein the digital pre-distortion circuit is further configured to, for the $I^{th}$ harmonic frequency zone:

determine a second magnitude of the complex baseband signal at a second time before the first time;

generate an $I^{th}$ harmonic frequency zone multiplier for the second time based at least in part on the $I^{th}$ harmonic frequency zone exponent and a second value of the complex baseband signal at the second time;

select a third look up table (LUT) value from a second tap LUT of the $I^{th}$ harmonic frequency zone based at least in part on the second magnitude of the complex baseband signal; and generate a second tap LUT product for the $I^{th}$ harmonic frequency zone based at least in part on the third LUT value and the $I^{th}$ harmonic frequency zone multiplier for the second time, wherein the $I^{th}$ harmonic frequency zone output is also based at least on part on the second tap LUT product.

18. A method comprising:

receiving a complex baseband signal; and generating a pre-distorted signal, wherein the generating comprises:

applying to the complex baseband signal a first correction for an $N^{th}$ order distortion of a power amplifier at an $I^{th}$ harmonic frequency zone centered at about an $I^{th}$ harmonic of a carrier frequency; and applying to the complex baseband signal a second correction for the $N^{th}$ order distortion at a $J^{th}$ harmonic frequency zone centered at about a $J^{th}$ harmonic of the carrier frequency different than the $I^{th}$ harmonic of the carrier frequency.

19. The method of claim 18, further comprising:

determining a value for a first complex basis function for the $N^{th}$ order distortion at the $I^{th}$ harmonic frequency zone based at least in part on the complex baseband signal;

determining a value for a second complex basis function for the $N^{th}$ order distortion at the $I^{th}$ harmonic frequency zone based at least in part on the complex baseband signal;

applying a first filter to generate a first filter response based at least in part on the value for the first complex basis function; and applying a second filter to generate a second filter response based at least in part on the value for the second complex basis function.

20. The method of claim 18, further comprising:

determining a first magnitude of the complex baseband signal at a first time;

for the $I^{th}$ harmonic frequency zone:

generating an $I^{th}$ harmonic frequency zone exponent based at least in part on an the $N^{th}$ order distortion of the power amplifier;

generating an $I^{th}$ harmonic frequency zone multiplier for the first time based at least in part on the $I^{th}$ harmonic frequency zone exponent;

selecting a first look up table (LUT) value from a first tap LUT of the $I^{th}$ harmonic frequency zone based at least in part on the first magnitude of the complex baseband signal;

generating a first tap LUT product for the $I^{th}$ harmonic frequency zone based at least in part on the first LUT value and the $I^{th}$ harmonic frequency zone multiplier for the first time; and generating an $I^{th}$ harmonic frequency zone output based at least in part on the first tap LUT product for the $I^{th}$ harmonic frequency zone and an $I^{th}$ harmonic frequency zone carrier component;

for the $J^{th}$ harmonic frequency zone:

generating a $J^{th}$ harmonic frequency zone exponent based at least in part on the $N^{th}$ order distortion of the power amplifier generating a $J^{th}$ harmonic frequency zone multiplier based at least in part on the Jth harmonic frequency zone exponent;

selecting a second LUT value from a first tap LUT of the $J^{th}$ harmonic frequency zone based at least in part on the first magnitude of the complex baseband signal;

generating a first tap LUT product for the $J^{th}$ harmonic frequency zone based at least in part on the second LUT value and the $J^{th}$ harmonic frequency zone multiplier; and generating a $J^{th}$ harmonic frequency zone output based at least in part on the first tap LUT product for the $J^{th}$ harmonic frequency zone and a $J^{th}$ harmonic frequency zone carrier component.

21. The method of claim 18, further comprising:

generating an harmonic frequency zone exponent for the $I^{th}$ harmonic frequency zone based at least in part on the $N^{th}$ order distortion of the power amplifier;

generating a $I^{th}$ harmonic frequency zone multiplier based at least in part on the $I^{th}$ harmonic frequency zone exponent;

selecting a LUT value from a first tap LUT of the $I^{th}$ harmonic frequency zone based at least in part on a first magnitude of the complex baseband signal at a first time;

generating a first tap LUT product for the $I^{th}$ harmonic frequency zone based at least in part on the LUT value and the harmonic frequency zone multiplier; and generating an $I^{th}$ harmonic t frequency zone output based at least in part on the first tap LUT product for the $I^{th}$ harmonic frequency zone and an $I^{th}$ harmonic frequency zone carrier component;

determining a value for a first complex basis function for the $N^{th}$ order distortion of the power amplifier at a $J^{th}$ harmonic frequency zone, wherein the first complex basis function is based at least in part on the complex baseband signal; and applying a first filter to generate a first response based at least in part on the value for the first complex basis function.

22. A digital predistortion system comprising:

means for receiving a complex baseband signal; and means for generating a pre-distorted signal, the generating of the pre-distorted signal comprising:

applying to the complex baseband signal a first correction for an $N^{th}$ order distortion of a power amplifier at an $I^{th}$ harmonic frequency zone centered at about an $I^{th}$ harmonic of a carrier frequency; and applying to the complex baseband signal a second correction for the $N^{th}$ order distortion at a $J^{th}$ harmonic frequency zone centered at about a $J^{th}$ harmonic of the carrier frequency different than the $I^{th}$ harmonic of the carrier frequency.

* * * * *

UNITED STATES PATENT AND TRADEMARK OFFICE
CERTIFICATE OF CORRECTION

PATENT NO. : 10,224,970 B2
APPLICATION NO. : 15/159492
DATED : March 5, 2019
INVENTOR(S) : Patrick Pratt It is certified that error appears in the above-identified patent and that said Letters Patent is hereby corrected as shown below:

In the Claims

In Column 27, Line 9, in Claim 5, after "vector;", insert --and--

In Column 27, Line 28, in Claim 7, delete "Jth" and insert --$J^{th}$-- therefor In Column 27, Line 37, in Claim 8, before "harmonic", insert --$I^{th}$--

In Column 27, Line 45, in Claim 8, after "harmonic", delete "t"

In Column 28, Line 32, in Claim 14, delete "generated" and insert --generate-- therefor In Column 28, Line 35, in Claim 14, delete "generated" and insert --generate-- therefor In Column 28, Line 56, in Claim 16, before "harmonic", insert --$I^{th}$--

In Column 30, Line 7, in Claim 20, delete "Jth" and insert --$J^{th}$-- therefor In Column 30, Line 21, in Claim 21, before "harmonic", insert --$I^{th}$--

In Column 30, Line 33, in Claim 21, before "harmonic", insert --$I^{th}$--

In Column 30, Line 34, in Claim 21, after "harmonic", delete "t"

Signed and Sealed this
Thirtieth Day of July, 2019

Andrei Iancu
*Director of the United States Patent and Trademark Office*